(12) United States Patent
de Vries

(10) Patent No.: US 7,240,162 B2
(45) Date of Patent: Jul. 3, 2007

(54) SYSTEM AND METHOD FOR PREDICTIVE STREAMING

(75) Inventor: Jeffrey de Vries, Sunnyvale, CA (US)

(73) Assignee: Stream Theory, Inc., Irvine, CA (US)

( * ) Notice: Subject to any disclaimer, the term of this patent is extended or adjusted under 35 U.S.C. 154(b) by 277 days.

(21) Appl. No.: 10/988,014

(22) Filed: Nov. 12, 2004

(65) Prior Publication Data

US 2006/0106770 A1     May 18, 2006

Related U.S. Application Data

(60) Provisional application No. 60/621,178, filed on Oct. 22, 2004.

(51) Int. Cl.
*G06F 12/00*     (2006.01)

(52) U.S. Cl. ........................ 711/137; 711/213

(58) Field of Classification Search ............. None
See application file for complete search history.

(56) References Cited

U.S. PATENT DOCUMENTS

| | | | |
|---|---|---|---|
| 4,796,220 A | 1/1989 | Wolfe | |
| 5,063,500 A | 11/1991 | Shorter | |
| 5,109,413 A | 4/1992 | Comeford et al. | |
| 5,210,850 A | 5/1993 | Kelly et al. | |
| 5,293,556 A | 3/1994 | Hill et al. | |
| 5,442,791 A | 8/1995 | Wrabetz et al. | |
| 5,495,411 A | 2/1996 | Ananda | |
| 5,548,645 A | 8/1996 | Ananda | |
| 5,666,293 A | 9/1997 | Metz et al. | |
| 5,696,965 A | 12/1997 | Dedrick | |
| 5,701,427 A | 12/1997 | Lathrop | |
| 5,706,440 A | 1/1998 | Compliment et al. | |
| 5,715,403 A | 2/1998 | Stefik | |
| 5,764,906 A | 6/1998 | Edelstein et al. | |
| 5,778,395 A | 7/1998 | Whiting et al. | |
| 5,805,809 A | 9/1998 | Singh et al. | |
| 5,809,144 A | 9/1998 | Sirbu et al. | |
| 5,822,537 A | 10/1998 | Katseff et al. | |

(Continued)

FOREIGN PATENT DOCUMENTS

WO    PCT/US2006/010637     3/2006

(Continued)

OTHER PUBLICATIONS

U.S. Appl. No. 10/023,915, filed Dec. 14, 2001, De Vries et al.

(Continued)

*Primary Examiner*—Jasmine Song
(74) *Attorney, Agent, or Firm*—Perkins Coie LLP

(57) ABSTRACT

A technique for predictive streaming involves receiving a request for a block associated with a streaming application and serving data associated with the block. A block request database is checked to predict what block is likely to be requested next based upon prior block request data. The predicted block may be identified when serving the data associated with the requested block. A system developed according to the technique includes a streaming server, a block request database, and a prediction engine that uses the block request database to predict block requests. The streaming server provides data associated with the predicted block request.

14 Claims, 13 Drawing Sheets

U.S. PATENT DOCUMENTS

| | | | |
|---|---|---|---|
| 5,835,722 A | 11/1998 | Bradshaw et al. | |
| 5,838,910 A | 11/1998 | Domenikos et al. | |
| 5,878,425 A | 3/1999 | Redpath | |
| 5,881,232 A | 3/1999 | Cheng et al. | |
| 5,892,915 A | 4/1999 | Duso et al. | |
| 5,895,454 A | 4/1999 | Harrington | |
| 5,903,721 A | 5/1999 | Sixtus | |
| 5,903,732 A | 5/1999 | Reed et al. | |
| 5,903,892 A | 5/1999 | Hoffert et al. | |
| 5,905,868 A | 5/1999 | Baghai et al. | |
| 5,909,545 A | 6/1999 | Frese et al. | |
| 5,911,043 A | 6/1999 | Duffy et al. | |
| 5,918,015 A | 6/1999 | Suzuki et al. | |
| 5,923,885 A | 7/1999 | Johnson | |
| 5,933,603 A | 8/1999 | Vahalia et al. | |
| 5,933,822 A | 8/1999 | Braden-Harder et al. | |
| 5,943,424 A | 8/1999 | Berger et al. | |
| 5,948,062 A | 9/1999 | Tzelnic et al. | |
| 5,948,065 A | 9/1999 | Eilert et al. | |
| 5,949,877 A | 9/1999 | Traw et al. | |
| 5,953,506 A | 9/1999 | Kalra et al. | |
| 5,960,411 A | 9/1999 | Hartman et al. | |
| 5,963,944 A | 10/1999 | Admas | |
| 5,973,696 A | 10/1999 | Arganat et al. | |
| 5,987,454 A | 11/1999 | Hobbs | |
| 6,014,686 A | 1/2000 | Elnozahy et al. | |
| 6,018,619 A | 1/2000 | Allrad et al. | |
| 6,026,166 A | 2/2000 | LeBourgeois | |
| 6,028,925 A | 2/2000 | Van Berkum et al. | |
| 6,038,379 A | 3/2000 | Fletcher et al. | |
| 6,038,610 A | 3/2000 | Belfiore et al. | |
| 6,047,323 A | 4/2000 | Krause | |
| 6,061,738 A | 5/2000 | Osaku et al. | |
| 6,065,043 A | 5/2000 | Domenikos et al. | |
| 6,081,842 A | 6/2000 | Shachar et al. | |
| 6,085,186 A | 7/2000 | Christianson et al. | |
| 6,085,193 A | 7/2000 | Malkin et al. | |
| 6,088,705 A | 7/2000 | Lightstone | |
| 6,094,649 A | 7/2000 | Bowen et al. | |
| 6,099,408 A | 8/2000 | Schneier et al. | |
| 6,101,482 A | 8/2000 | DiAngelo et al. | |
| 6,101,491 A | 8/2000 | Woods | |
| 6,108,420 A | 8/2000 | Larose et al. | |
| 6,138,271 A | 10/2000 | Keeley | |
| 6,154,878 A | 11/2000 | Saboff | |
| 6,157,948 A | 12/2000 | Inoue et al. | |
| 6,167,510 A * | 12/2000 | Tran | 712/239 |
| 6,185,608 B1 | 2/2001 | Hon et al. | |
| 6,192,398 B1 | 2/2001 | Hunt et al. | |
| 6,192,408 B1 | 2/2001 | Vahalia et al. | |
| 6,219,693 B1 | 4/2001 | Napolitano et al. | |
| 6,226,665 B1 | 5/2001 | Deo et al. | |
| 6,253,234 B1 | 6/2001 | Hunt et al. | |
| 6,275,496 B1 | 8/2001 | Burns et al. | |
| 6,278,992 B1 | 8/2001 | Curtis et al. | |
| 6,282,712 B1 | 8/2001 | Davis et al. | |
| 6,298,356 B1 | 10/2001 | Jawahar et al. | |
| 6,301,605 B1 | 10/2001 | Napolitano et al. | |
| 6,301,629 B1 * | 10/2001 | Sastri et al. | 710/305 |
| 6,311,221 B1 | 10/2001 | Raz et al. | |
| 6,330,561 B1 | 12/2001 | Cohen et al. | |
| 6,347,398 B1 | 2/2002 | Parthasarathy et al. | |
| 6,356,946 B1 | 3/2002 | Clegg et al. | |
| 6,370,686 B1 | 4/2002 | Delo et al. | |
| 6,374,402 B1 | 4/2002 | Schmeidler et al. | |
| 6,418,554 B1 | 7/2002 | Delo et al. | |
| 6,418,555 B2 | 7/2002 | Mohammed | |
| 6,449,688 B1 | 9/2002 | Peters et al. | |
| 6,453,334 B1 | 9/2002 | Vinson et al. | |
| 6,457,076 B1 | 9/2002 | Cheng et al. | |
| 6,510,458 B1 | 1/2003 | Berstis et al. | |
| 6,510,462 B2 | 1/2003 | Blumenau | |
| 6,510,466 B1 | 1/2003 | Cox et al. | |
| 6,574,618 B2 | 6/2003 | Eylon et al. | |
| 6,584,507 B1 | 6/2003 | Bradley et al. | |
| 6,587,857 B1 | 7/2003 | Carothers et al. | |
| 6,598,125 B2 | 7/2003 | Romm | |
| 6,601,103 B1 | 7/2003 | Goldschmidt Iki et al. | |
| 6,601,110 B2 | 7/2003 | Marsland | |
| 6,609,114 B1 | 8/2003 | Gressel et al. | |
| 6,622,137 B1 | 9/2003 | Ravid et al. | |
| 6,622,171 B2 | 9/2003 | Gupta et al. | |
| 6,636,961 B1 | 10/2003 | Braun et al. | |
| 6,687,745 B1 | 2/2004 | Franco et al. | |
| 6,694,510 B1 | 2/2004 | Williems | |
| 6,697,869 B1 | 2/2004 | Mallart et al. | |
| 6,711,619 B1 | 3/2004 | Chanderamohan et al. | |
| 6,735,631 B1 | 5/2004 | Oehrke et al. | |
| 6,757,708 B1 | 6/2004 | Craig et al. | |
| 6,757,894 B2 | 6/2004 | Eylon et al. | |
| 6,763,370 B1 | 7/2004 | Schmeidler et al. | |
| 6,772,209 B1 | 8/2004 | Chernock et al. | |
| 6,779,179 B1 | 8/2004 | Romm et al. | |
| 6,785,768 B2 | 8/2004 | Peters et al. | |
| 6,810,525 B1 | 10/2004 | Safadi et al. | |
| 6,816,909 B1 | 11/2004 | Chang et al. | |
| 6,816,950 B2 * | 11/2004 | Nichols | 711/162 |
| 6,832,222 B1 | 12/2004 | Zimowski | |
| 6,836,794 B1 | 12/2004 | Lucowsky et al. | |
| 6,854,009 B1 | 2/2005 | Hughes | |
| 6,891,740 B2 * | 5/2005 | Williams | 365/49 |
| 6,918,113 B2 | 7/2005 | Patel et al. | |
| 6,925,495 B2 | 8/2005 | Hedge et al. | |
| 6,938,096 B1 | 8/2005 | Greschler et al. | |
| 6,959,320 B2 | 10/2005 | Shah et al. | |
| 7,028,305 B2 | 4/2006 | Schaefer et al. | |
| 7,043,524 B2 | 5/2006 | Shah et al. | |
| 7,051,315 B2 | 5/2006 | Artiz et al. | |
| 7,062,567 B2 | 6/2006 | Benitez et al. | |
| 7,093,077 B2 * | 8/2006 | Cooksey et al. | 711/137 |
| 2001/0037399 A1 | 11/2001 | Eylon et al. | |
| 2001/0037400 A1 | 11/2001 | Raz et al. | |
| 2001/0044850 A1 | 11/2001 | Raz et al. | |
| 2002/0019864 A1 | 2/2002 | Mayer | |
| 2002/0042833 A1 | 4/2002 | Hendler et al. | |
| 2002/0078170 A1 | 6/2002 | Brewer et al. | |
| 2002/0078203 A1 | 6/2002 | Greschler et al. | |
| 2002/0083183 A1 | 6/2002 | Pujare et al. | |
| 2002/0083187 A1 | 6/2002 | Sim et al. | |
| 2002/0087717 A1 | 7/2002 | Artzi et al. | |
| 2002/0087883 A1 | 7/2002 | Wohlgemuth et al. | |
| 2002/0091763 A1 | 7/2002 | Shah et al. | |
| 2002/0138640 A1 | 9/2002 | Raz et al. | |
| 2002/0156911 A1 | 10/2002 | Croman et al. | |
| 2002/0157089 A1 | 10/2002 | Patel et al. | |
| 2002/0161908 A1 | 10/2002 | Benitez et al. | |
| 2002/0174215 A1 | 11/2002 | Schaefer | |
| 2003/0004882 A1 | 1/2003 | Holler et al. | |
| 2003/0009538 A1 | 1/2003 | Shah et al. | |
| 2003/0056112 A1 | 3/2003 | Vinson et al. | |
| 2003/0140160 A1 | 7/2003 | Raz et al. | |
| 2004/0230971 A1 | 11/2004 | Rachman et al. | |
| 2004/0268361 A1 | 12/2004 | Schaefer | |
| 2005/0010670 A1 | 1/2005 | Greschler et al. | |
| 2005/0193139 A1 | 9/2005 | Vinson et al. | |
| 2006/0048136 A1 | 3/2006 | De Vries et al. | |
| 2006/0123185 A1 | 6/2006 | De Vries et al. | |
| 2006/0136389 A1 | 6/2006 | Cover et al. | |

FOREIGN PATENT DOCUMENTS

| | | |
|---|---|---|
| WO | PCT/US2006/010904 | 3/2006 |
| WO | WO 2006/022745 A2 | 3/2006 |
| WO | WO 2006/047133 A2 | 5/2006 |

WO    WO 2006/055445 A2    5/2006

OTHER PUBLICATIONS

U.S. Appl. No. 11/274,442, filed Nov. 14, 2005, De Vries et al.
U.S. Appl. No. 11/371,627, filed Mar. 8, 2006, De Vries et al.
U.S. Appl. No. 11/388,381, filed Mar. 23, 2006, De Vries et al.
Boneh et al, An Attack on RSA Given a Small Fraction of the Private Key Bits, Advances in Cryptology—ASIACRYPT '98, Lecture Notes in Computer Science, 25-34, V. 1514, Springer-Verlag Berlin Heidelberg, retrieved online on Jun. 15, 2006 at http://crypto.stanford.edu/~dabo/abstracts/bits_of_d.html.
Binto, George et al, Secure Transaction Processing in Firm Real-Time Database Systems, SIGMOD International Conference on Management of Data 1997, 462-473, V26, Issue 2, Association for Computing Machinery (ACM) Press, Tucson, Arizona, United States.
Chu, et al, REFEREE: Trust Management for Web Applications, Proceedings of the Sixth International World Wide Web Conference, 1997, retrieved online Jun. 15, 2006 at http://www.si.umich.edu/~presnick/papers/Referee/www6-referee.html.
Faupel, Status of Industry Work on Signed Mobile Code, Joint European Networking Conference (JENC), May 1997, 313-1-313-8.
Fiedler et al, UNIX System V, Release 4 Administration, Second Edition, 1991, 1-13, 37-116, 152-153, 175-200, 291-312, Hayden Books, Carmel, Indiana, USA.

Mullender et al, Amoeba: A Distributed Operating System for the 1990s, Computer Magazine, May 1990, 44-53, 23(5).
Nakayoshi et al, A Secure Private File System with Minimal System Administration, Communications, Computers and Signal Processing, 1997 IEEE Pacific Rim Conference, 251-255, vol. 1.
O'Mahony, Donal, Security Considerations in a Network Management Environment, 1994, 12-17, vol. 8, IEEE, USA.
Pyarali et al, Design and Performance of an Object-Oriented Framework for High-Speed Electronic Medical Imaging, Fall 1996, Computing Systems Journal, 331-375, vol. 9 No. 4, USENIX, retrieved online on Jun. 15, 2006 at http://www.cs.wustl.edu/~schmidt/PDF/COOTS-96.pdf.
Reinhardt, Robert B., An Architectural Overview of UNIX Network Security, ARINC Research Corporation, Sep. 19, 1992, retrieved online Jun. 15, 2006 at http://www.clusit.it/whitepapers/unixnet.pdf.
Tardo & Valente, Mobile Agent Security and Telescript, 4$^{th}$ International Conference of the IEEE Computer Society (IEEE CompCon1996), Feb. 1996.
U.S. Appl. No. 10/926,635, filed Aug. 25, 2004, Jeffrey De Vries.
U.S. Appl. No. 10/988,014, filed Nov. 11, 2004, Jeffrey De Vries.

* cited by examiner

| Request Log 232 |
|---|
| Block |
| 7 |
| 8 |
| 3 |
| 5 |
| 8 |
| 6 |

| Block Request Database 234 ||
|---|---|
| Block | Predicted Block Parameters Array |
| 3 | [(5, 1.0)] |
| 4 | [ ] |
| 5 | [(8, 1.0)] |
| 6 | [ ] |
| 7 | [(8, 1.0)] |
| 8 | [(3, 0.5), (6, 0.5)] |

FIG. 7A

| Request Log 236 ||
|---|---|
| Block | Time |
| 7 | 01:03:12 |
| 8 | 01:05:36 |
| 3 | 01:10:56 |
| 5 | 07:29:00 |
| 8 | 07:32:30 |
| 6 | 11:42:45 |

| Block Request Database 238 ||
|---|---|
| Block | Predicted Block Parameters Array |
| 3 | [(5, 1.0, 6:18:04)] |
| 4 | [ ] |
| 5 | [(8, 1.0, 0:03:30)] |
| 6 | [ ] |
| 7 | [(8, 1.0, 0:02:24)] |
| 8 | [(3, 0.5, 0:05:20), (6, 0.5, 5:10:15)] |

FIG. 7B

| Request Log 240 |||
|---|---|---|
| Client | Block | Time |
| 1 | 7 | 01:03:12 |
| 1 | 8 | 01:05:36 |
| 2 | 8 | 01:10:25 |
| 1 | 3 | 01:10:56 |
| 2 | 3 | 01:11:18 |
| 2 | 4 | 01:18:23 |
| 1 | 5 | 07:29:00 |
| 1 | 8 | 07:32:30 |
| 1 | 6 | 11:42:45 |
| 3 | 8 | 12:05:36 |
| 2 | 8 | 12:10:25 |
| 3 | 3 | 12:10:56 |
| 2 | 3 | 12:11:47 |

| Block Request Database 242 ||
|---|---|
| Block | Predicted Block Parameters Array |
| 3 | [(4, 0.5, 0:07:05), (5, 0.5, 6:18:04)] |
| 4 | [(8, 1.0, 10:52:02)] |
| 5 | [(8, 1.0, 0:03:30)] |
| 6 | [ ] |
| 7 | [(8, 1.0, 0:02:24)] |
| 8 | [(3, 0.8, 0:00:53), (6, 0.2, 5:10:15)] |

FIG. 7C

244 — Request Log

| Block | |
|---|---|
| 7 | ⎫ |
| 8 | ⎬ Session 1 |
| 3 | ⎭ |
| 8 | ⎫ |
| 3 | ⎬ Session 2 |
| 4 | ⎭ |
| 5 | ⎫ |
| 8 | ⎬ Session 3 |
| 6 | ⎭ |
| 8 | ⎫ Session 4 |
| 3 | ⎭ |
| 8 | ⎫ Session 5 |
| 3 | ⎭ |

246 — Block Request Database

| Block | Zero-Order Probability |
|---|---|
| 3 | 0.8 |
| 4 | 0.2 |
| 5 | 0.2 |
| 6 | 0.2 |
| 7 | 0.2 |
| 8 | 1.0 |

FIG. 8A

248 — Request Log

| Block | |
|---|---|
| 7 | ⎫ |
| 8 | ⎬ Session 1 |
| 3 | ⎭ |
| 8 | ⎫ |
| 3 | ⎬ Session 2 |
| 4 | ⎭ |
| 5 | ⎫ |
| 8 | ⎬ Session 3 |
| 6 | ⎭ |
| 8 | ⎫ Session 4 |
| 3 | ⎭ |
| 8 | ⎫ Session 5 |
| 3 | ⎭ |

250 — Block Request Database

| Block | First-Order Probability | | | | | |
|---|---|---|---|---|---|---|
| | 3 | 4 | 5 | 6 | 7 | 8 |
| 3 | n/a | 1.0 | 0 | 0 | 1.0 | 0.8 |
| 4 | 0.25 | n/a | 0 | 0 | 0 | 0.2 |
| 5 | 0 | 0 | n/a | 1.0 | 0 | 0.2 |
| 6 | 0 | 0 | 1.0 | n/a | 0 | 0.2 |
| 7 | 0.25 | 0 | 0 | 0 | n/a | 0.2 |
| 8 | 1.0 | 1.0 | 1.0 | 1.0 | 1.0 | n/a |

FIG. 8B

SYSTEM AND METHOD FOR PREDICTIVE STREAMING

CLAIM OF PRIORITY

This application claims priority to U.S. Provisional Application 60/621,178, entitled SYSTEM AND METHOD FOR PREDICTIVE STREAMING, filed Oct. 22, 2004, which is hereby incorporated by reference in its entirety.

BACKGROUND

Software streaming involves downloading small pieces of files as the pieces are needed by the program being streamed. These small pieces may be referred to as blocks. A streaming client sends requests for blocks as they are needed up to a streaming server, which sends back streaming data that is associated with the requested block. Sending a request and receiving the streaming data may cause delays that can slow down the streamed program.

There are many problems associated with streaming software that it would be advantageous to negate, work around, or reduce. For example, predicting blocks for streaming has not been satisfactorily addressed.

SUMMARY

A technique for predictive streaming involves receiving a request for a first block of a streaming application, checking a block request database, predicting a second block request based on the block request database, and sending, in response to the request, data associated with the first block and data associated with the second block. A block may be an arbitrarily large portion of a streaming application. The block request database includes probabilities or means for determining probabilities that the second block will be requested given that the first block has been requested. One or more factors may be considered when determining the probability of a request for the second block. Data sent in response to the request may include data associated with the first block and data associated with the second block. The data associated with the first block and the data associated with the second block may not be analogous. In an embodiment, the data associated with the first block is responsive to a block request for the first block, while the data associated with the second block is data sufficient to facilitate making a request for the second block.

In an embodiment, the technique may further include predicting block requests based on the block request database, then sending data associated with the block requests. In another embodiment, the data associated with the second block includes data sufficient to render a request for the second block unnecessary. In another embodiment, the technique further includes piggybacking the data associated with the second block on a reply to the request for the first block. In another embodiment, the technique further includes logging the request for the first block and updating the block request database to incorporate data associated with the logged request. In another embodiment, the technique further includes setting an aggressiveness parameter, wherein the data associated with the second block is sent when a probability of the second block request is higher than the aggressiveness parameter.

A system constructed according to the technique may include a processor, a block request database that includes predictive parameters, a prediction engine that is configured to check the block request database and predict a second block request for a second block based upon a first block request for a first block and predictive parameters associated with the first block, and a streaming server. The streaming server may be configured to obtain the prediction about the second block request from the prediction engine, include data associated with the second block in a response to the first block request, in addition to data associated with the first block, and send the response in reply to the first block request.

In an embodiment, the data associated with the second block is sufficient to identify the second block so as to facilitate making the second block request. In another embodiment, the data associated with the second block includes data sufficient to render the second block request unnecessary. In another embodiment, the streaming server is further configured to piggyback the data associated with the second block on a reply to the first block request. In another embodiment, the system includes a request log, wherein the streaming server is further configured to log the first block request in the request log. The prediction engine may be further configured to update the block request database according to the request log.

BRIEF DESCRIPTION OF THE DRAWINGS

FIGS. 7A to 7C and 8A to 8B depict exemplary request logs and block request databases according to embodiments;

DETAILED DESCRIPTION

Parametric predictive streaming involves maintaining parameters (parametric) to predict (predictive) which blocks will be requested by or served to a streaming client (streaming). Parametric predictive streaming can improve pipe saturation with large reads or facilitate rapid provision of sequential small reads. Parametric predictive streaming may, in an exemplary embodiment, also be adaptive. Parametric predictive adaptive streaming involves changing parameters over time as access patterns are learned.

Figure 1:
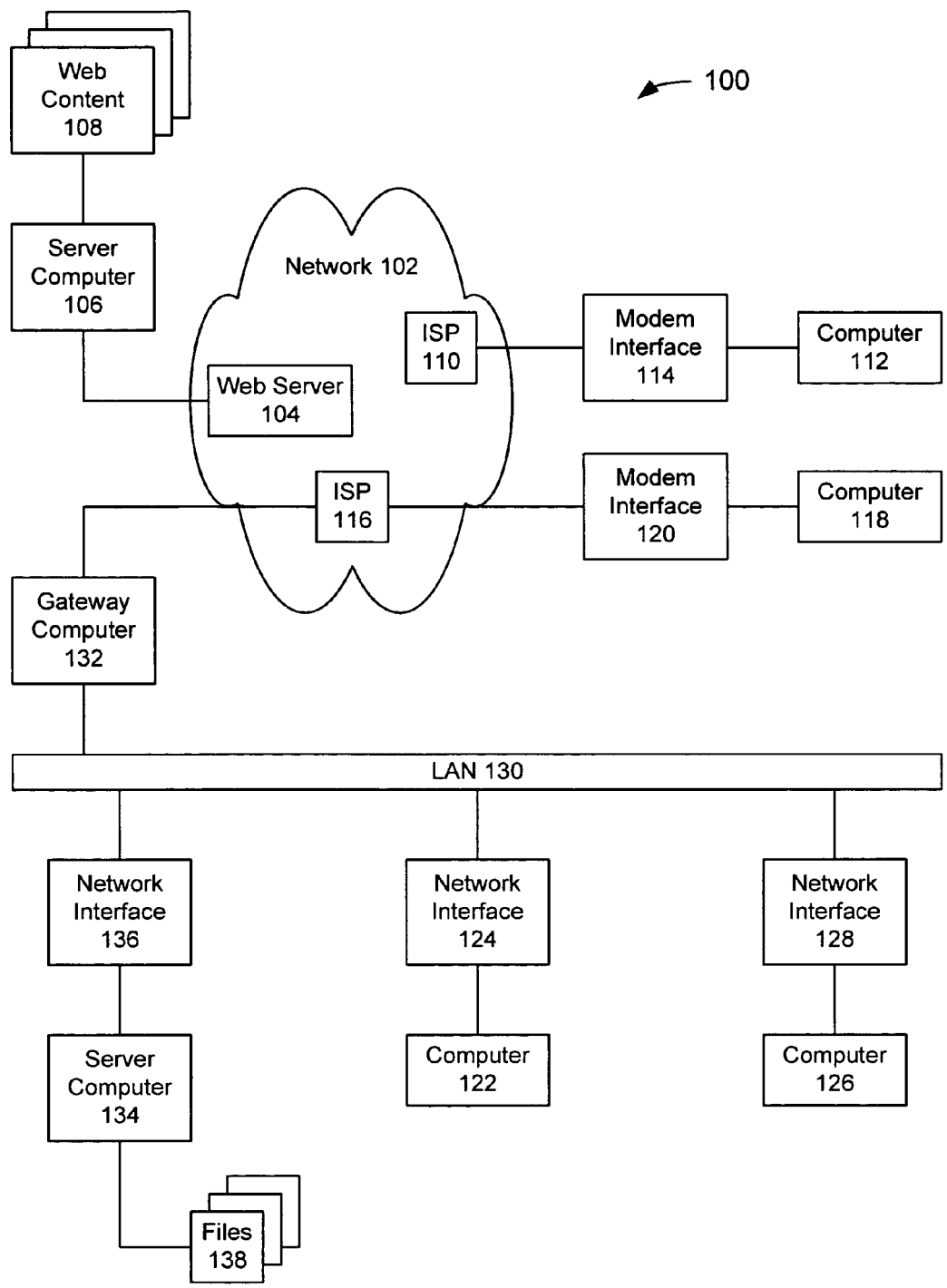
FIG. 1 depicts a networked system for use in an exemplary embodiment.
Figure 2:
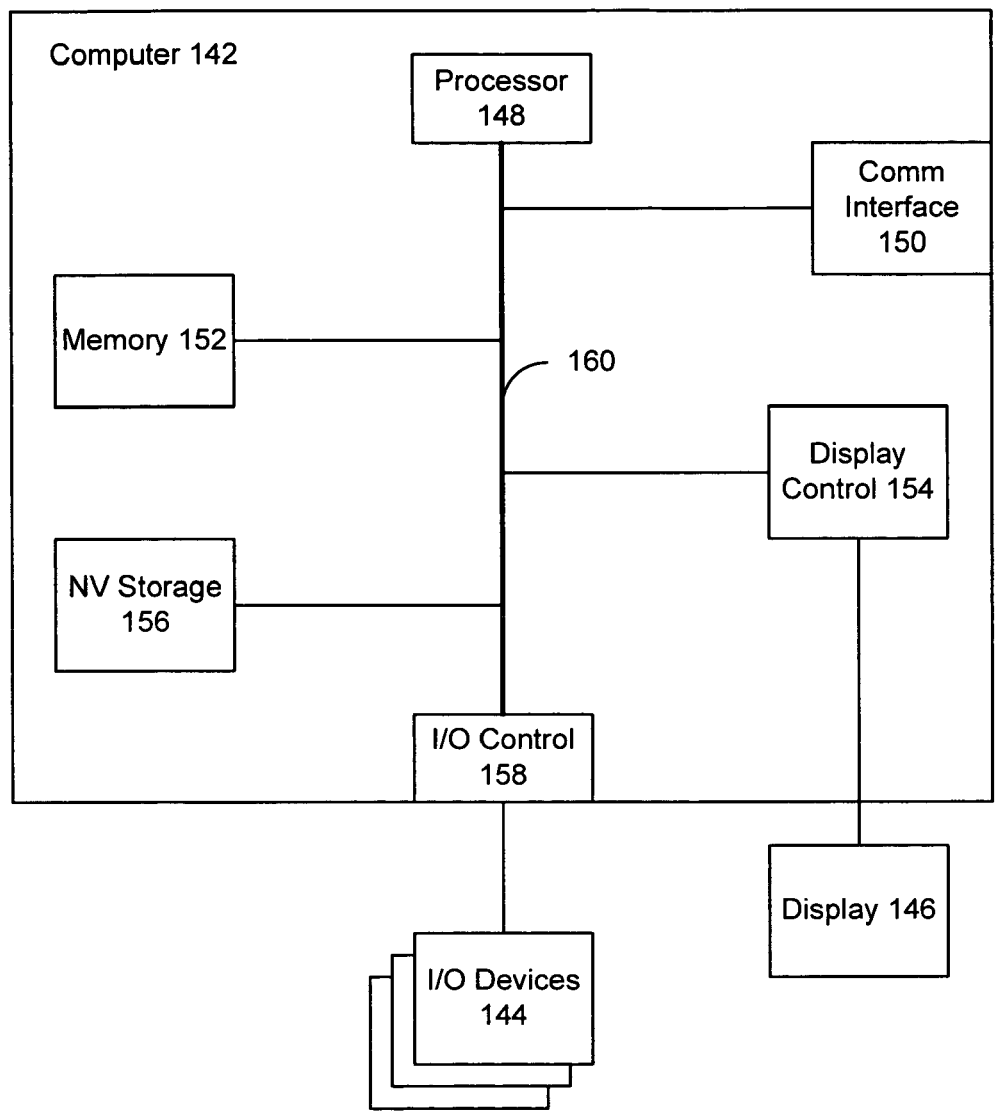
FIG. 2 depicts a computer system for use in the system of FIG. 1.
Figure 3:
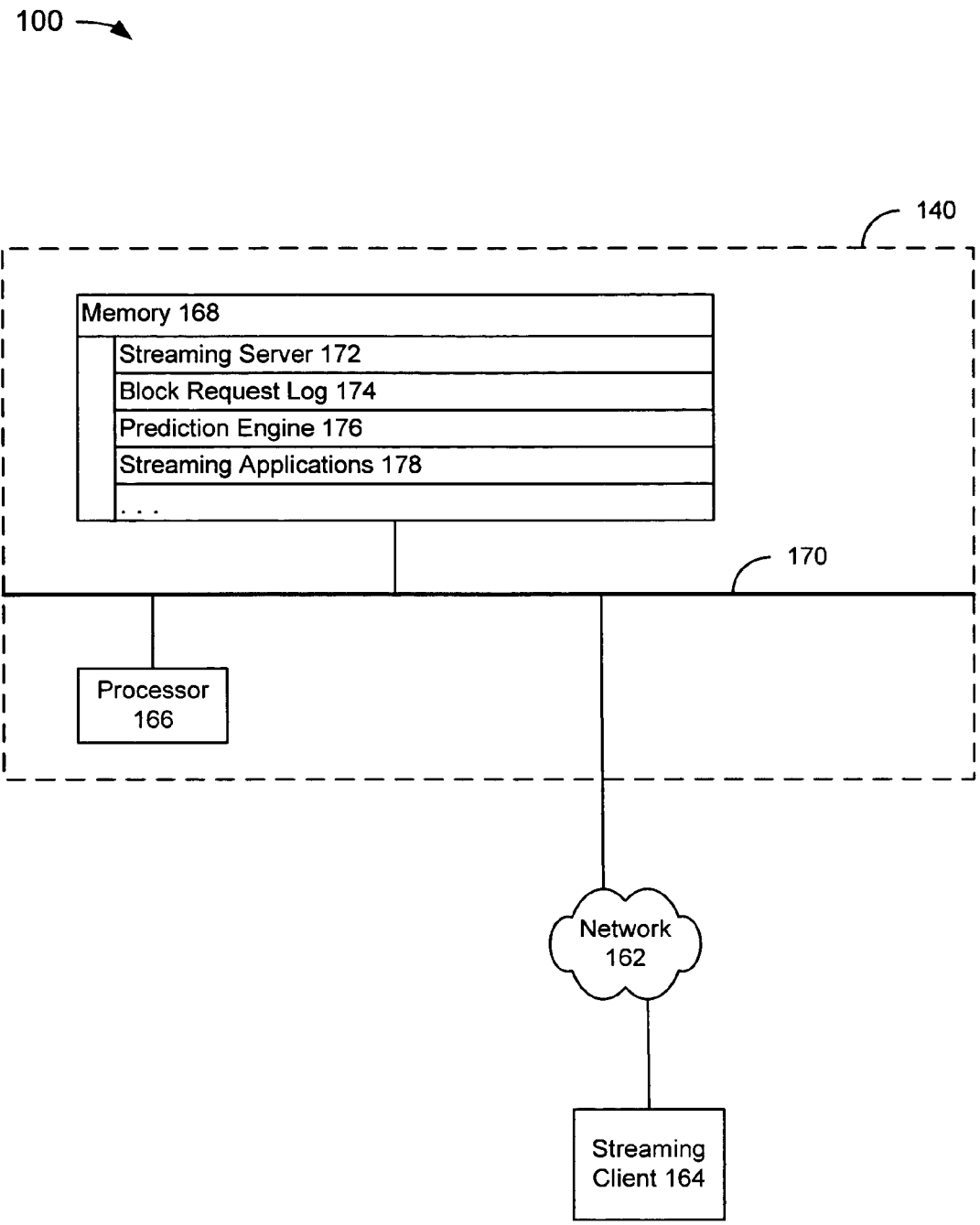
FIG. 3 depicts a portion of the computer system of FIG. 2 and components of the system of FIG. 1.

The following description of FIGS. 1–3 is intended to provide an overview of computer hardware and other operating components suitable for performing the methods of the invention described herein, but is not intended to limit the applicable environments. Similarly, the computer hardware and other operating components may be suitable as part of the apparatuses of the invention described herein. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 depicts a networked system 100 that includes several computer systems coupled together through a network 102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 104 is typically at least one computer system which operates as a server computer system and is configured to operate with the protocols of the world wide web and is coupled to the Internet. The web server system 104 can be a conventional server computer system. Optionally, the web server 104 can be part of an ISP which provides access to the Internet for client systems. The web server 104 is shown coupled to the server computer system 106 which itself is coupled to web content 108, which can be considered a form of a media database. While two computer systems 104 and 106 are shown in FIG. 1, the web server system 104 and the server computer system 106 can be one computer system having different software components providing the web server functionality and the server functionality provided by the server computer system 106, which will be described further below.

Access to the network 102 is typically provided by Internet service providers (ISPs), such as the ISPs 110 and 116. Users on client systems, such as client computer systems 112, 118, 122, and 126 obtain access to the Internet through the ISPs 110 and 116. Access to the Internet allows users of the client computer systems to exchange information, receive and send e-mails, and view documents, such as documents which have been prepared in the HTML format. These documents are often provided by web servers, such as web server 104, which are referred to as being "on" the Internet. Often these web servers are provided by the ISPs, such as ISP 110, although a computer system can be set up and connected to the Internet without that system also being an ISP.

Client computer systems 112, 118, 122, and 126 can each, with the appropriate web browsing software, view HTML pages provided by the web server 104. The ISP 110 provides Internet connectivity to the client computer system 112 through the modem interface 114, which can be considered part of the client computer system 112. The client computer system can be a personal computer system, a network computer, a web TV system, or other computer system. While FIG. 1 shows the modem interface 114 generically as a "modem," the interface can be an analog modem, isdn modem, cable modem, satellite transmission interface (e.g. "direct PC"), or other interface for coupling a computer system to other computer systems.

Similar to the ISP 114, the ISP 116 provides Internet connectivity for client systems 118, 122, and 126, although as shown in FIG. 1, the connections are not the same for these three computer systems. Client computer system 118 is coupled through a modem interface 120 while client computer systems 122 and 126 are part of a LAN 130.

Client computer systems 122 and 126 are coupled to the LAN 130 through network interfaces 124 and 128, which can be ethernet network or other network interfaces. The LAN 130 is also coupled to a gateway computer system 132 which can provide firewall and other Internet-related services for the local area network. This gateway computer system 132 is coupled to the ISP 116 to provide Internet connectivity to the client computer systems 122 and 126. The gateway computer system 132 can be a conventional server computer system.

Alternatively, a server computer system 134 can be directly coupled to the LAN 130 through a network interface 136 to provide files 138 and other services to the clients 122 and 126, without the need to connect to the Internet through the gateway system 132.

FIG. 2 depicts a computer system 140 for use in the system 100 (FIG. 1). The computer system 140 may be a conventional computer system that can be used as a client computer system or a server computer system or as a web server system. Such a computer system can be used to perform many of the functions of an Internet service provider, such as ISP 110 (FIG. 1). The computer system 140 includes a computer 142, I/O devices 144, and a display device 146. The computer 142 includes a processor 148, a communications interface 150, memory 152, display controller 154, non-volatile storage 156, and I/O controller 158. The computer system 140 may be couple to or include the I/O devices 144 and display device 146.

The computer 142 interfaces to external systems through the communications interface 150, which may include a modem or network interface. It will be appreciated that the communications interface 150 can be considered to be part of the computer system 140 or a part of the computer 142. The communications interface can be an analog modem, isdn modem, cable modem, token ring interface, satellite transmission interface (e.g. "direct PC"), or other interfaces for coupling a computer system to other computer systems.

The processor 148 may be, for example, a conventional microprocessor such as an Intel Pentium microprocessor or Motorola power PC microprocessor. The memory 152 is coupled to the processor 148 by a bus 160. The memory 152 can be dynamic random access memory (dram) and can also include static ram (sram). The bus 160 couples the processor 148 to the memory 152, also to the non-volatile storage 156, to the display controller 154, and to the I/O controller 158.

The I/O devices 144 can include a keyboard, disk drives, printers, a scanner, and other input and output devices, including a mouse or other pointing device. The display controller 154 may control in the conventional manner a display on the display device 146, which can be, for example, a cathode ray tube (CRT) or liquid crystal display (LCD). The display controller 154 and the I/O controller 158 can be implemented with conventional well known technology.

The non-volatile storage 156 is often a magnetic hard disk, an optical disk, or another form of storage for large amounts of data. Some of this data is often written, by a direct memory access process, into memory 152 during execution of software in the computer 142. One of skill in the art will immediately recognize that the terms "machine-readable medium" or "computer-readable medium" includes any type of storage device that is accessible by the processor 148 and also encompasses a carrier wave that encodes a data signal.

The computer system 140 is one example of many possible computer systems which have different architectures. For example, personal computers based on an Intel microprocessor often have multiple buses, one of which can be an I/O bus for the peripherals and one that directly connects the processor 148 and the memory 152 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 152 for execution by the processor 148. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

In addition, the computer system 140 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 156 and causes the processor 148 to execute the various acts required by the operating system to input and output data and to store data in memory, including storing files on the non-volatile storage 156.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

FIG. 3 depicts a portion of the computer system 140 (FIG. 2) and components of the system 100 (FIG. 1). FIG. 3 depicts the computer system 140, a network 162, and a streaming client 164. The network 162 could be a global information network, such as the Internet, a local or wide area network (LAN or WAN), or some other intranet or network. For example, the network 102 (FIG. 1) could include the network 162. Alternatively, the LAN 130 (FIG. 1) could include the network 162. In another alternative, the computer system 140 may by physically or wirelessly coupled to the streaming client 164.

The streaming client 164 may be coupled to and accessible through the network 162. The streaming client 164 could be a software, firmware, or hardware module. Alternatively, the streaming client 164 could include some combination of software, firmware, or hardware components. The streaming client 164 may be part of a computer system, such as the computer system 140 (FIG. 2). The streaming client 164 may include a processor, a memory, and a bus that couples the processor to the memory. The streaming client 164, or a computer system associated with the streaming client 164, may make use of certain programs when executing a streaming application. For example, a streaming application may be intended for use with a specific version of DirectX™, Acrobat™, or QuickTime™, which typically is installed prior to executing the streaming application.

The computer system 140 includes a processor 166, a memory 168, and a bus 170 that couples the processor 166 to the memory 168. The memory 168 may include both volatile memory, such as DRAM or SRAM, and non-volatile memory, such as magnetic or optical storage. The memory 168 may also include, for example, environment variables. The processor 166 executes code in the memory 168. The memory 168 includes a streaming server 172, a block request database 174, a prediction engine 176, and one or more streaming applications 178. Some or all of the programs, files, or data of the computer system 140 could be served as Web content, such as by the server computer 106 (FIG. 1). The programs, files, or data could be part of a server computer on a LAN or WAN, such as the server computer 134 (FIG. 1).

The streaming server 172 may be configured to serve data associated with a block of a streaming application, such as one of the streaming applications 178, in response to a request for the block. The block request database 174 may include data associated with block requests received from one or more streaming clients, such as the streaming client 164. The block request database 174 may include a block request log, which is updated with each or with a subset of block requests. The block request database 174 may be client-specific or generally used by all or a subset of all streaming clients from which block requests are received. The block request database 174 may be application-specific or generally associated with all or a subset of all of the streaming applications 178. The block request database 174 may include a block request history that has been derived from data associated with block requests received over time, from some original default values, or from data input by, for example, a user or software agent that administers the computer system 140. The block request database 174 may include parameters derived from individual block requests, a block request log, or a block request history.

The prediction engine 176 is configured to predict one or more blocks, if any, the streaming client 164 will request. The term "engine," as used herein, generally refers to any combination of software, firmware, hardware, or other component that is used to effect a purpose. The prediction engine 176 may include an aggressiveness parameter (not shown). If the aggressiveness is high, the prediction engine 176 is more likely to make a prediction than if the aggressiveness is low. In an exemplary embodiment, the aggressiveness parameter is associated with a probability threshold. The probability threshold may be a cut-off probability that results in predictions being made for blocks that are determined to have a probability of being requested that exceeds the cut-off probability. In another exemplary embodiment, the prediction engine 176 may predict any block with a probability of being requested that is higher than the probability threshold. In these examples, it should be noted that the aggressiveness parameter is low (i.e., the probability threshold is low) when aggressiveness is high. Nevertheless, for the purposes of linguistic clarity, hereinafter, it is assumed that the aggressiveness parameter is high when aggressiveness is high. For example, if the aggressiveness parameter is associated with a threshold probability, x, then the value of the aggressiveness parameter may be thought of as 1−x, which means the aggressiveness parameter is high when aggressiveness is high. This is for the purposes of linguistic clarity, and should not be construed as a limitation as to how the aggressiveness parameter is implemented. It should also be noted that the aggressiveness parameter is not limited to a threshold probability.

When the prediction engine 176 makes a prediction, the streaming server 172 may communicate the prediction to the streaming client 164. The prediction may include identifying data for one or more blocks, each of which met aggressiveness criteria, such as by having a predicted probability of being requested that is higher than a probability threshold. Identifying data, as used herein, is data sufficient to enable a streaming client to make a request for one or more blocks that are associated with the identifying data. The identifying data may, for example, include a block ID associated with a block. This identifying data may facilitate predictive requests for blocks before the blocks are actually needed at the streaming client 164. In an exemplary embodiment wherein the identifying data is provided to a streaming client 164, the streaming client 164 may determine whether to request the block associated with streaming data. This may help prevent downloading streaming data that the streaming client 164 doesn't really want or need. For example, if the streaming server 172 predicts that a streaming client 164 will need streaming data associated with a first block, and sends streaming data associated with the first block, the streaming client 164 is unable to choose whether to receive the streaming data based on, for example, local factors. On the other hand, if the streaming client 164 receives identifying data, the streaming client 164 may determine whether it actually wants the streaming data. In an alternative embodiment, the streaming server 172 may sometimes serve streaming data associated with a predicted block right away, possibly without even receiving a request from the streaming client 164 for the predicted block.

The prediction engine 176 may give a weight to a number of blocks. For example, the prediction engine 176 may predict a first block that is more likely to be requested than a second block (a probability parameter). The streaming client 164 may first request the blocks with, for example, the highest probability of being requested. As another example, the prediction engine 176 may give greater weight to a first block over a second block if the prediction engine 176 predicts the first block will be requested sooner than the second block (a temporal parameter). As another example, the prediction engine 176 may give greater weight to a first block over a second block if the first block is larger than the second block (a size parameter). The prediction engine 176 may weigh parameters associated with the streaming client 164, as well. For example, if the streaming client 164 has a limited buffer size, the aggressiveness parameter may be set lower. As another example, if the download bandwidth is low, the prediction engine 176 may place more weight on temporal or size parameters. Alternatively, the streaming client 164 may manage block requests according to local conditions, while the prediction engine 176 acts the same for all or a subset of all streaming clients.

In operation, the streaming client 164 sends over the network 162 to the streaming server 172 a request for a block associated with a streaming application of the streaming applications 178. The streaming server 172, or some other component (not shown) of the computer system 140, logs the request. For the purposes of example only, the block request database 174 is treated as a block request log. However, in various embodiments, the block request database 174 could be derived from a block request log or from individual or groups of block requests that are not recorded in a log. In an exemplary embodiment, the block request database 174 includes parameters derived from previous block requests, or from default or initial settings, that aid in predicting subsequent block requests from the streaming client 164.

The prediction engine 176 uses data from the block request database 174 to predict a subsequent block request. The subsequent block request may be for, for example, a block from the same streaming application as the initial block request, from a DLL, from a data file, from a different executable file, or from any other file or application. The streaming server 172 serves streaming data associated with the requested block and identifying data associated with the predicted block to the streaming client 164. The streaming client 164 then decides whether to request the identified predicted block. For example, the streaming client 164 may already have data for the block associated with the identifying data in a local cache. If the streaming server 172 sends the data again, that is a waste of bandwidth and may slow down the execution of the streaming application. Since the streaming server 172 sends identifying data instead of streaming data, the streaming client 164 can, for example, check the local cache first, and request the streaming data if it is not already available in the local cache. In another embodiment, the streaming server 172 serves streaming data associated with the requested block and identifying data associated with one or more predicted blocks. The streaming client 164 then decides which of the identified blocks to request and, for example, in what order. Naturally, if the prediction engine 176 is correct in its prediction, the streaming client 164 will eventually request a predicted block in due course even if the streaming client 164 does not request the predicted block in response to receiving the identifying data.

Figure 4:
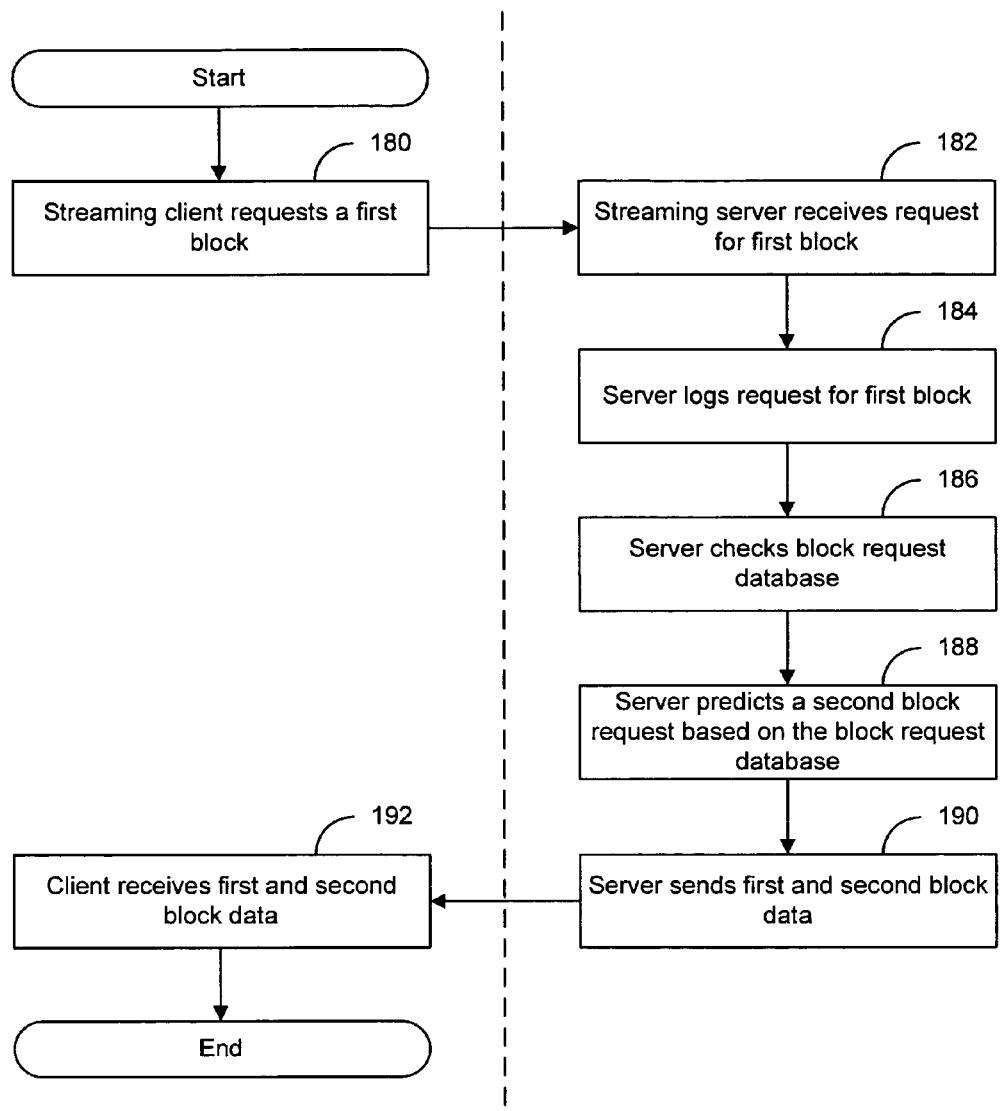
FIGS. 4 and 5 depict flowcharts of exemplary methods for predictive streaming according to embodiments.

FIG. 4 depicts a flowchart of an exemplary method for predictive streaming according to an embodiment. The flowchart starts at module 180 with requesting a first block. The request may originate from a streaming client. The flowchart continues at module 182 with receiving the request for the first block. The receipt may be at a streaming server. The streaming server may log the request. The flowchart continues at module 184 with checking a block request database. The server may check the block request database. The block request database may include the logged requests. The flowchart continues at module 186 with predicting a second block request based on the block request database. The server may use a prediction engine to predict the second block request. The prediction may be based upon block requests for the first block followed by block requests for the second block from a streaming client. The flowchart continues at module 188 with piggybacking a second block ID on a reply that includes block data associated with the first block. The flowchart continues at module 190 with receiving the first block data and the second block ID. The flowchart continues at module 192 with determining whether to request the second block based on local factors. The flowchart continues at module 194 with requesting the second block. It is assumed for the purposes of example that local factors merit the request for the second block. For example, if streaming data associated with the second block is in a local disk cache, the second block may not be requested. The flowchart continues at module 196 with receiving the request for the second block. The flowchart continues at module 198 with second a reply that includes block data associated with the second block. The flowchart ends at module 200 with receiving the second block data. It should be noted that, though the flowchart may be thought of as depicting sequential small reads, as opposed to depicting building large blocks, the blocks could very well be large. This method and other methods are depicted as serially arranged modules. However, modules of the methods may be reordered, or arranged for parallel execution as appropriate.

When a streaming server sends data associated with a predicted block (second block) request along with data associated with a requested block (first block), the first and second block data may be thought of as a "large block" if they are queued for sending back-to-back. However, in order to queue the first and second blocks back-to-back, the streaming server would have to receive the request for the second block and queue the second block data before the streaming server was finished sending the first block data. When data is sent as a large block, the streaming server can have nearly continuous output. Large blocks can help to more fully utilize available bandwidth, since large data requests can fully "saturate the pipe." This is in contrast to sequential requests for blocks, which may not saturate the pipe because of the pause between sending first block streaming data and receiving a request for and sending second block streaming data. Fully saturating the pipe can improve performance.

In some cases, a block may be made large initially. For example, if a streaming application is for a level-based game, a large block may include data associated with an entire level. When a request for the block is received, data associated with the entire level is returned as continuous output from the streaming server. Alternatively, large blocks can be built "on the fly" based on a first block request and predicted block requests. For example, if the streaming server sends identifying data for multiple predicted block requests piggybacked on a reply to a first block request, along with streaming data associated with the first block, the streaming client can consecutively request some or all of the multiple predicted blocks. If the requests are made in relatively rapid succession, the streaming server may queue streaming data associated with two predicted blocks more rapidly than the streaming server sends streaming data associated with one predicted block. In this way, the streaming server maintains a full queue and, accordingly, can keep the pipe saturated.

Figure 5:
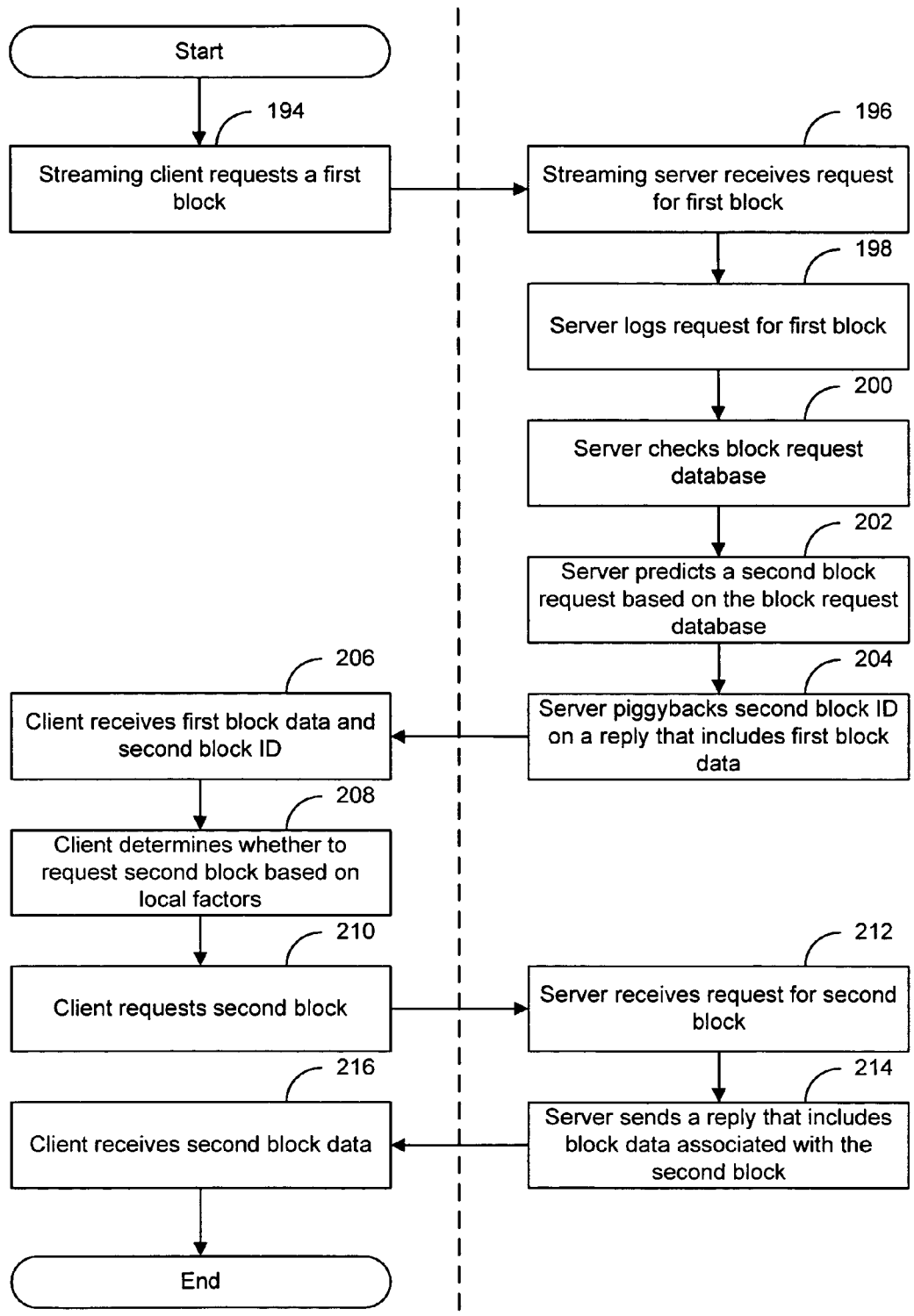

FIG. 5 depicts a flowchart of an exemplary method for predictive streaming according to an embodiment. The flowchart starts at module 202 with requesting a first block. The flowchart continues at module 204 with receiving the request for the first block. The streaming server may log the request. The flowchart continues at module 206 with predicting block requests based on the first block request. The server may use a prediction engine to predict the block requests. The prediction engine may make use of a block request database that includes parameters derived from, for example, prior block requests for the first block. The flowchart continues at module 208 with sending streaming data associated with the first block and identifying data for the predicted blocks. The streaming server may piggyback the identifying data on a reply to the request for the first block. The flowchart continues at module 210 with receiving the streaming data and the identifying data. The streaming client may receive the data. The flowchart continues at module 212 with requesting one or more predicted blocks in succession. The streaming client may determine, based upon local factors, which of the blocks associated with the identifying data are to be requested. The streaming client may or may not order the predictive block requests according to factors associated with the blocks. For example, the streaming client may make predictive block requests in the order of probability. The probability for each block may be sent along with the identifying data or derived locally. The flowchart continues at module 214 with receiving the predictive block requests. The flowchart continues at module 216 with saturating the output pipe with streaming data associated with the multiple blocks. The streaming server may saturate the output pipe by queuing streaming data as fast as or faster than the streaming data is sent to the streaming client. The streaming server may maintain output pipe saturation even if queuing streaming data slower than streaming data is sent to the streaming client as long as the queue remains non-empty. The streaming server may or may not maintain output pipe saturation for an entire streaming session. When the streaming server saturates the pipe, it is presumed that the streaming server does not maintain saturation throughout the entire streaming session, though total saturation may be possible. When the streaming server saturates the pipe, the pipe is not necessarily perfectly saturated. Streaming data is not necessarily sent in a perfectly continuous stream. A continuous stream of data, as used herein, means data that is sent from a non-empty queue. If there is a period of time during which the output queue is empty, first and second streams of data sent before and after the period of time are not referred to as continuous. The flowchart ends at module 218 with receiving the streaming data. The streaming client may receive the streaming data. Though the streaming server saturates the pipe, the streaming client may or may not receive a continuous stream of data, depending on various factors that are well-understood in the art of data transmission, such as network delays, and are, therefore, not described herein.

At times, a streaming client may rapidly request blocks in a strictly sequential manner. For example, if a sequence of blocks is associated with a video clip, the blocks are reasonably likely to be served, in order, one after the other. A streaming server may recognize a sequential pattern of block requests, either because the streaming server is provided with the pattern, or because the streaming server notices the pattern from block requests it receives over time. The streaming server may send the pattern to the streaming client in response to a block request that has been found to normally precede block requests for blocks that are identified in the pattern. Using the pattern, the streaming client may predictively request additional blocks in anticipation of the streaming application needing them. The streaming client may make these requests in relatively rapid succession, since each request can be made using the pattern the streaming client received from the streaming server. This may result in output pipe saturation at the streaming server. The streaming client may or may not wait for a reply to each request. Predictively requested blocks may be stored in a local cache until they are needed. The parameters that control recognition of the pattern, as well as how aggressive the read-ahead schedule should be, can be independently specified at the file, file extension, directory, and application level. In addition, it can be specified that some blocks are predictively downloaded as soon as a file is opened (even before seeing a read) and that the open call itself should wait until the initial blocks have been downloaded. In an exemplary embodiment, the pattern includes identifying data for each block represented in the pattern. The patterns may be included in a block request database.

In an alternative embodiment, the streaming server may provide the streaming client with one or more patterns as a pattern database. The streaming server may or may not provide the pattern database when the streaming client first requests streaming of a streaming application associated with the pattern database. The streaming client may use the pattern database to predict which blocks to request based on block requests it intends to make. For example, if a first block request is associated with blocks in a pattern in the pattern database, the streaming client requests the first block and each of the blocks in the pattern in succession. The pattern database may be included in a block request database.

Figure 6:
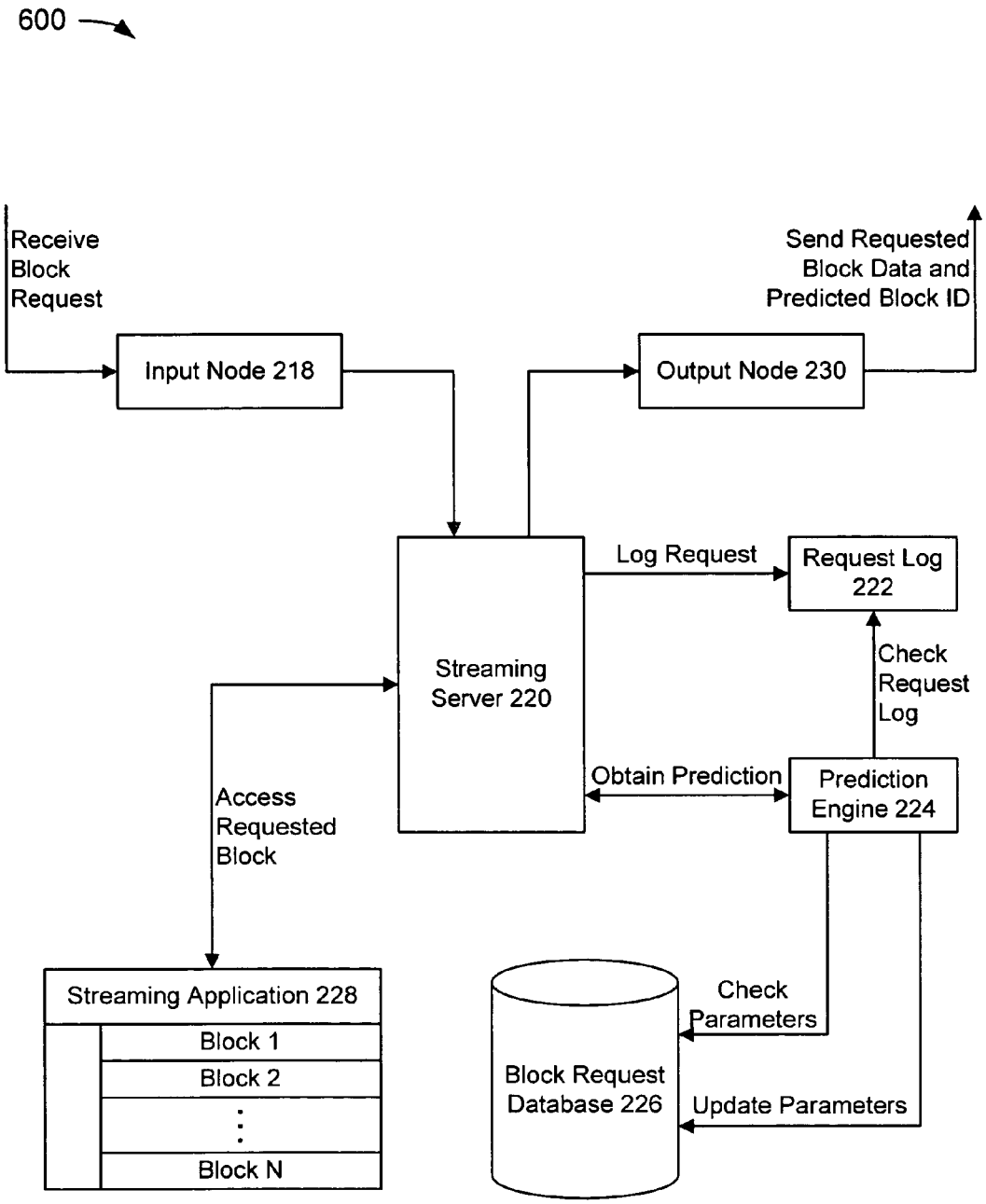
FIG. 6 depicts a conceptual view of a system 600 for providing streaming data and identifying a predicted block in response to a block request according to an embodiment.

FIG. 6 depicts a conceptual view of a system 600 for providing block data and identifying a predicted block in response to a block request according to an embodiment. The system 600 includes an input node 218, a streaming server 220, a request log 222, a prediction engine 224, a block request database 226, a streaming application 228, and an output node 230. The input node 218 may be an interface for connecting the system 600 to other computer systems, or a logical node within the system 600 for providing block requests to the streaming server 220. The input node 218 may or may not be treated as part of the streaming server 220. The streaming server 220 may include software, firmware, hardware, or a combination thereof. The streaming server 220 may include one or more dedicated processors or share one or more processors (not shown) with other local or remote components. The request log 222 may be a log that records incoming traffic, as is well-known in the art of computer networking, or a dedicated log that only records block requests. The request log 222 may be associated with the streaming application 228 or multiple streaming applications (not shown). The request log 222 may be associated with one or more streaming clients (not shown), either individually, in the aggregate, or in some combination. The request log may be dedicated to the streaming server 220, or associated with multiple streaming servers (not shown). The request log may be local or remote with respect to the streaming server 220. The prediction engine 224 may include software, firmware, hardware, or a combination thereof. The prediction engine may include one or more dedicated processors or share one or more processors (not shown) with other local components, such as the streaming server 220, or remote components (not shown). The prediction engine 224 may or may not be treated as part of the streaming server 220. The block request database 226 may include software, firmware, hardware, or a combination thereof The block request database 226 may or may not be treated as part of the request log 222, part of the prediction engine 224, or part of the streaming server 220. In an alternative embodiment, block request database 226 includes the request log 222. The block request database 226 includes block request parameters. The parameters may be stored in memory as constants or variables, act as or be environment variables. The parameters may be locally or remotely available. The parameters may be input manually, input automatically, or derived. The parameters may or may not change over time depending upon inputs from a user or agent, block requests, or other factors. The streaming application 228 is any application that is available for streaming. The streaming application 228 may or may not be prepared for streaming in advance, such as is disclosed, for example, in the U.S. patent application Ser. No. 10/926,635, filed Aug. 25, 2004, entitled, INTERCEPTION-BASED RESOURCE DETECTION SYSTEM, which is incorporated herein in its entirety for all purposes. While only the streaming application 228 is illustrated in FIG. 6, multiple streaming applications could be included in the system 600. The multiple streaming applications could be discretely managed (e.g., by allowing only predictions of blocks from the same streaming application as a requested block) or as a collection of blocks (e.g., a predicted block could be from a streaming application that is different from that of the requested block). The streaming applications could be local or remote. The output node 230 may be an interface for connecting the system 600 to other computer systems, or a logical node within the system 600 for sending block requests from the streaming server 220. The output node 230 may or may not be treated as part of the streaming server 220. The output node 230 and the input node 218 may or may not be treated as components of an input/output node.

In operation, the input node 219 receives a block request from a streaming client (not shown). The input node 219 provides the block request to the streaming server 220. The streaming server 220 logs the block request in the request log 222. The streaming server obtains a prediction from the prediction engine 224. The logging of the request and the obtaining of a prediction need not occur in any particular order. For example, the streaming server 220 could obtain a prediction from the prediction engine 224 prior to (or without consideration of) the logged block request.

The prediction engine 224 checks the request log 222, performs calculations to represent data in the request log 222 parametrically, and updates the parameters of the block request database 226. The prediction engine 224 checks the parameters of the block request database 226 in order to make a prediction as to subsequent block requests from the streaming client. The checking of the request log and checking of the parameters need not occur in any particular order. For example, the prediction engine 224 could check the parameters prior to checking the request log and updating the parameters. The prediction engine 224 could check the request log and update the parameters as part of a routine updating procedure, when instructed to update parameters by a user or agent of the system 600, or in response to some other stimulus, such as an access to the streaming application 228. Accordingly, the checking of the log request and updating of the parameters may be thought of as a separate, and only indirectly related, procedure vis-à-vis the checking of parameters to make a prediction. The prediction may be in the form of one or more block IDs, identifying data for one or more blocks, a pattern, or any other data that can be used by a streaming client to determine what blocks should be requested predictively.

When the streaming server 220 obtains the prediction, the streaming server 220 optionally accesses the requested block of the streaming application 228. Obtaining the prediction and accessing the requested block need not occur in any particular order and could overlap. The prediction provided to the streaming server 220 may or may not be modified by the streaming server 220. For example, the prediction may include data that is used to "look up" identifying data. In this case, the portion of the streaming server 220 that is used to look up identifying data may be referred to as part of the prediction engine 224.

Access to the requested block of the streaming application 228 is optional because the streaming server 220 could simply return an identifier of the predicted block without sending the predicted block itself. Indeed, it may be more desirable to send only a prediction because the recipient of the prediction (e.g., a streaming client) may already have received the block. If the recipient already received the block, and the block remains cached, there is probably no reason to send the block again. Accordingly, the streaming server, upon receiving the prediction, would not request the predicted block again. The streaming server 220 can be referred to as obtaining identifying data from the prediction engine 224, where the identifying data can be used by, for example, the streaming client when making one or more predictive block requests.

The streaming server 220 provides data associated with the requested block, such as streaming data, and the prediction, such as identifying data, to the output node 230. The data is sent from the output node 230 to, for example, a streaming client (not shown). In an exemplary embodiment, the prediction is piggy-backed on the reply that includes the, for example, streaming data. In another exemplary embodiment, the prediction could be sent separately, either before, at approximately the same time as, or after the reply that includes the, for example, streaming data. In an alternative embodiment, the streaming server 220 could access a predicted block of the streaming application 228 and send a reply that includes streaming data associated with the predicted block as part of the reply that includes the requested block data. Or, the streaming server 220 could send streaming data associated with the predicted block separately, before, at the same time as, or after sending the reply that includes the requested block data.

A prediction may or may not always be provided by the prediction engine 224. If no prediction is provided to the streaming server 220, the streaming server may simply provide streaming data associated with the requested block. In an exemplary embodiment, the prediction engine 224 may fail to provide a prediction if it does not have sufficient data to make a prediction. Alternatively, the prediction engine 224 may provide a prediction only if it meets a certain probability. For example, an aggressiveness parameter may be set to a cut-off threshold of, e.g., 0.5. If predictive certainty for a block does not meet or exceed the cut-off threshold, the prediction engine 224 may not provide the prediction for the block to the streaming server 220.

FIGS. 7A to 7C are intended to help illustrate how to predict a block request based on the requested block. FIGS. 7A to 7C depict exemplary block request logs and parameters derived therefrom according to embodiments. FIGS. 7A to 7C are not intended to illustrate preferred embodiments because there are many different items of data that could be recorded or omitted in the request log and many different parameters that could be derived from selected items of data.

FIG. 7A depicts an exemplary request log 232 and a block request database 234. In this example, the request log 232 includes a listing of blocks in the order the blocks were requested from a streaming client. For exemplary purposes, the request log 232 is assumed to be associated with a single streaming client. The request log 232 may or may not be associated with a single streaming application. The block request database 234 includes parameters derived from the request log 232. For exemplary purposes, the parameters are derived only from entries in the request log 232. In alternative embodiments, the parameters could include default values or otherwise rely on data that is not included in the request log 232. For the purposes of example, the request log 232 is assumed to include only the values shown in FIG. 7A. For the purposes of example, a block request (the current block request) is considered for each of the blocks 3 to 8.

Current block request for block 3: As illustrated in the request log 232, a block request for block 5 (the second block request) immediately follows the request for block 3 (the first block request). Since the second block request follows the request for block 3, a prediction can be made about whether the current block request (for block 3) will be followed by a request for block 5. Since, for the purposes of example, the parameters are derived only from the request log 232 (and no other data is considered), it might be assumed that a request for block 5 is 100% certain. The predicted block parameters array for block 3 is [(5, 1.0)]. This can be interpreted to mean, following a request for block 3, the probability of a request for block 5 is 1.0. Of course, this is based on a small data sample and is, therefore, subject to a very large error. However, over time the probability may become more accurate.

Current block request for block 4: As illustrated in the request log 232, a block request for block 4 has not been made. Accordingly, no prediction can be made.

Current block request for block 5: For reasons similar to those given with respect to the request for block 3, the predicted parameters array for block 5 is [(8, 1.0)].

Current block request for block 6: As illustrated in the request log 232, a block request for block 6 has been made before, but it was the last block requested (none follow). Accordingly, no prediction can be made.

Current block request for block 7: For reasons similar to those given with respect to the request for block 3, the predicted parameters array for block 5 is [(8, 1.0)].

Current block request for block 8: As illustrated in the request log 232, a block request for block 8 has been made twice before. The block request following a request for block 8 was 3 one time and 6 the other time. It may be assumed, for exemplary purposes, that the request for block 3 or 6 is equally probable. Accordingly, the predicted block parameters array for block 8 is [(3, 0.5), (6, 0.5)]. This can be interpreted to mean, following a request for block 8, the probability of a request for block 3 is 0.5 and the probability of a request for block 6 is 0.5. Since the requests for blocks 3 and 6 are considered equally probable, data associated with both block 3 and block 6 may be included in a reply. Alternatively, neither may be used. Also, an aggressiveness parameter may be set that requires a higher than 0.5 probability in order to be predicted.

Other factors could be considered in "breaking a tie" between equally probable block predictions, such as blocks 3 and 6, which are predicted to follow block 8 in FIG. 7A. A higher-order predictor (e.g., a first-order predictor, as described later) could break the tie depending on whether block 7 was requested prior to block 8 (implying that block 3 is the better choice), or block 5 was requested prior to block 8 (implying that block 6 is the better choice). The returned list of predicted blocks may be constructed using all n-order predictors, and the best N predicted blocks, regardless of which n-order predictor it came from, may be returned in ranked order. If, for example, the first-order predictor gave a probability of 1.0 to predicted block 3, but the zero-order predictor gave a probability of 0.5, then block 3 would be included with a probability of 1.0, the max of the probabilities for that particular block.

In this example, a prediction was made as to which block was requested following a current block request, though in alternative examples, predictions could be made as to the next requested block, the one after, any other subsequent block request, or some combination thereof. Also, the predicted block parameters are represented in an array, but any data structure that captures the relevant information would be acceptable.

FIG. 7B depicts an exemplary request log 236 and a block request database 238 according to another embodiment. In this example, the request log 236 includes a listing of blocks in the order the blocks were requested from a streaming client, plus a time field that represents what time the blocks were sent by a streaming client. In an alternative, the time field may represent what time the blocks were received, logged, or otherwise managed. The block request database 238 includes a predicted block parameters array with a time field, which represents the time difference between when a first block request and a second block request were sent. For example, for the predicted block parameters array for block 3, the time field is 6:18:04, which is intended to mean 6 hours, 18 minutes, and 4 seconds. This is the difference between when block 3 and block 5 were sent, as shown in the request log 236. As another example, the predicted block parameters array for block 8 is [(3, 0.5, 0:05:20), (6, 0.5, 5:10:15)]. This can be interpreted to mean that blocks 3 and 6 are equally likely to be requested following a request for block 8. However, since there is a time entry, weight can be given to the entry with the lower associated time difference. Since, with respect to a streaming application, 5 hours is a long time, weight may be given to block 3 (requested about 5 minutes after block 8) over block 6 (requested about 5 hours after block 8). Indeed, in this example, since the time between block 6 and block 8 is so long, a prediction engine could choose to assume that there really isn't a predictive relationship between blocks 6 and 8.

In an embodiment, time-related predictive parameters may be ignored if they are too high. The threshold value over which a time difference would result in a block request being ignored may be referred to as a temporal aggressiveness parameter. For example, if a temporal aggressiveness parameter is 1 hour, then the predicted block parameters array for block 8 could be rewritten as [(3, 1.0, 0:05:20)]. That is, the values related to block 6 are ignored since block 6 was received more than 1 hour after block 8, according to the request log 236. Alternatively, the predicted block parameters array for block 8 could be rewritten as [(3, 0.5, 0:05:20)], which is basically the same, but the probability is not recalculated when the values related to block 6 are ignored. Similarly, the predicted block parameters array for block 3 could be rewritten as [ ], since there are no block requests within 1 hour (the temporal aggressiveness threshold, in this example) of the block request for block 3.

In an alternative embodiment, a prediction engine could keep chaining predicted blocks back through the prediction engine to get subsequent predicted blocks, under the assumption that the "first round" predicted blocks were correct. The probabilities of subsequent predicted blocks may be multiplied by the probability of the original predicted block to accurately get a predicted probability for the secondary (ternary, etc) blocks. This could continue until the probabilities fell below an aggressiveness threshold. A limit may be placed on the max number of predictions returned. It should be noted that in the case of a long chain of blocks that follow each other with probability 1.0, the first request may return a list of all subsequent blocks in the chain, which a streaming client can then "blast request" to keep the pipeline at the streaming server full.

FIG. 7C depicts an exemplary request log 240 and a block request database 242 according to another embodiment. FIG. 7C is similar to FIG. 7B, but entries in the request log 240 include a streaming client associated with a block request. In this example, the streaming client is assumed to have requested the block with which the streaming client is associated. For the purposes of determining the predicted block parameters, an entry for a given streaming client, for example client 1, is compared to other entries of the streaming client. It may make no difference whether, for example, client 2 requests a block some time after client 1. However, it may make a difference if client 1 requests block 3 after requesting block 8 and client 2 requests block 3 after requesting block 8. Using this principle, predictive parameters can adapt over time based on the block requests of various clients. The principles for calculating predictive parameters is the same as described with reference to FIG. 7B, but predictive accuracy can be improved by considering the block requests of multiple clients, as shown in the block request database 242 of FIG. 7C.

In an embodiment, the times are not actually recorded, as depicted in FIG. 7C. Rather, the times are used as a filter to decide whether one block truly follows another block in terms of predictive value. In such an embodiment, the entry for block 3 may be more similar to the example entry 242-1, which has a value of [(4, 1.0, 0:07:05)], than is depicted for illustrative purposes, in the block request database 242. In other words, in this alternative, the block request database 242 does not include any predictive data for block 5. Similarly, the entry for block 4 may be the empty set, and the entry for block 8 may be similar to the example entry 242-2. This alternative, where the probabilities are omitted for rejected blocks, may be more desirable since it omits data that is probably irrelevant for predictive purposes.

FIGS. 8A and 8B depict request logs and block request databases for use with zero order and first order predictions. In an exemplary embodiment, a streaming server builds up the zero, first, or higher order probabilities over time based on which blocks have been requested while streaming an application. FIG. 8A depicts a request log 244 and a block request database 246. Each block associated with a streaming application has a probability of being requested when streaming the streaming application that is based on how many times the block is requested when streaming the streaming application, compared to the total number of times the streaming application has been streamed. For the purposes of example, one instance, from beginning to end, of streaming a streaming application may be referred to as a session. In a given session, one or more blocks, in one or more combinations, may be requested.

A session may be thought of in terms of the block requests made over the course of streaming a streaming application. For example, in the five sessions depicted in the log request 244 of FIG. 8A, Session 1 consists of three block requests: 7, 8, and 3; Session 2 consists of three block requests: 8, 3, and 4; Session 3 consists of three block requests: 5, 8, and 6; Session 4 consists of two block requests: 8 and 3; and Session 5 consists of two block requests: 8and 3. Considering only these five sessions, a probability associated with a block request may be determined by adding the number of times a block is requested in a session and dividing the sum by the total number of sessions (in this case, five). For example, as shown in the block request database 246, Block 3, which is included in Sessions 1, 2, 4, and 5, has a zero order probability of 0.8. Blocks 4, 5, 6, and 7 each have a zero order probability of 0.2 because they are included only in Session 2, 3, 3, and 1, respectively. Since Block 8 is included in each of the Sessions 1–5, Block 8 has a zero order probability of 1.0. In an embodiment, probabilities are constructed over multiple sessions by multiple users to obtain composite probabilities.

In some embodiments, it may be desirable to utilize a higher order probability. For example, if the streaming application is a game program that starts in a room with four doors that lead to four different rooms, each of which is associated with multiple block requests, the multiple blocks associated with each of the four different rooms may be equally likely (about 25% each). If a door is selected, each of the multiple blocks associated with each of the doors (even those not taken) may be about 25%. By using a first-order predictor, once we see the first block request for one of the rooms, the subsequent blocks for that room will have first-order probabilities near 100%, and so the multiple blocks for that room can be predictively downloaded.

FIG. 8B is intended to illustrate first order probabilities. FIG. 8B depicts a request log 248 and a block request database 250. When determining first order probabilities, a first block request is used as context. In other words, if a first block request is made, the probability of a second block request may be calculated by comparing the probability, based upon previous sessions, that the second block request follows (or occurs during the same session as) the first block request. Since the probability of the second block request is based on one block of context, the probability may be referred to as a first order probability. First-order predictions may or may not be more accurate than zero-order predictions, and both zero- and first-order probabilities may be used, individually or in combination, when making a block request prediction.

Given the request log 248, the probability that a second block will be requested following a first block request can be determined for one or more sessions. The block request database 250 is organized to show the first-order probability for a block, given the context of another block. The block request database 250 is not intended to illustrate a data structure, but rather to simply illustrate, for exemplary purposes, first-order probability. The probability of a block request (for the block in the Block column) is depicted under the first-order probability for each block. For example, the first-order probability of a block request for Block 3 is 1.0 with Block 4 as context, 0 with Block 5 as context, 0 with Block 6 as context, 1.0 with Block 7 as context, and 0.8 with Block 8 as context. These probabilities are derived as follows. As is shown in the request log 248, when blocks 5 or 6 are requested (Session 3), block 4 is not requested. Accordingly, the first-order probability for block 3 with either block 5 or 6 as context is 0. When blocks 4 or 7 have been requested (Sessions 2 and 1, respectively), block 3 is also requested. Accordingly, the first-order probability for block 3 with block 4 as context is 1.0. When block 8 has been requested (all five sessions), block 3 is also requested 4 out of 5 times. Accordingly, the first-order probability for block 3 with block 8 as context is 0.8. First-order probabilities for each block can be derived in a similar manner. The probabilities are shown in the block request database 250.

Second- and higher-order probabilities can be determined in a similar manner to that described with reference to FIG. 8B, but with multiple block requests as context.

In an exemplary embodiment, a streaming server can use the zero- or higher order probabilities to determine which blocks have probabilities that exceed a "predictive download aggressiveness" parameter and piggyback those block IDs, but not the block data itself, onto the block data returned to a streaming client. The client can then decide which blocks it will predictively download, based on local factors. Local factors may include client system load, contents of the local disk cache, bandwidth, memory, or other factors.

It should be noted that in certain embodiments, it may not be possible to incorporate all incoming block requests into the request log because block requests are being "filtered" by the local disk cache. This may result in the request log including only those block requests for blocks that weren't in the local disk cache, which will throw the predictors off. Accordingly, in an embodiment, a streaming server may indicate to a streaming client that the server is interested in collecting prediction data. In this case, the streaming client would send a separate data stream with complete block request statistics to the streaming server. In this example, the separate data stream may include all actual block requests made by the application, regardless of whether that request was successfully predicted or is stored in a local cache of the streaming client.

Figure 9:
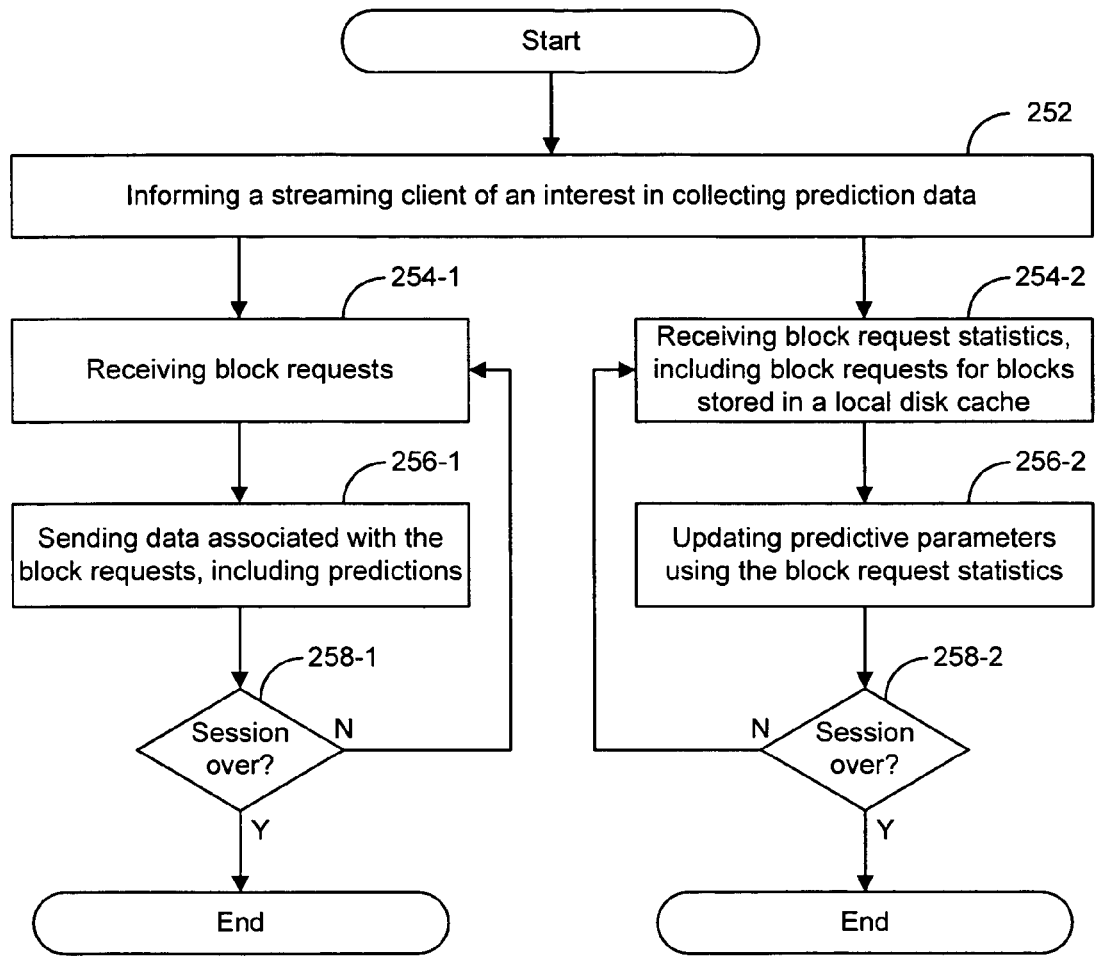
FIGS. 9 to 12 depict exemplary methods according to alternative embodiments.

FIG. 9 depicts a flowchart of an exemplary method for updating predictive parameters. The flowchart starts at module 252 with informing a streaming client of an interest in collecting prediction data. This request may or may not be included in a token file. The request may be sent to a streaming client when the streaming client requests streaming of an application. After module 252, the flowchart continues along two paths (254-1 and 254-2). The modules 254 may occur simultaneously, or one may occur before the other.

The flowchart continues at module 254-1 with receiving block requests. The streaming server may receive the block requests from the streaming client. The flowchart continues at module 256-1 with sending data associated with the block requests, including predictions, if any. The flowchart continues at decision point 258-1, where it is determined whether the session is over. If the session is not over, the flowchart continues from module 254-1 for another block request. Otherwise, if the session is over, the flowchart ends for modules 254-1 to 258-1.

The flowchart continues at module 254-2 with receiving block request statistics, including block requests for blocks stored in a local disk cache. Module 254-2 may or may not begin after module 258-1 ends. Module 254-2 may or may not continue after module 258-1 ends. The flowchart continues at module 256-2 with updating predictive parameters using the block request statistics. The predictive parameters may be used at module 256-1 to provide predictions. The flowchart continues at decision point 258-2, where it is determined whether the session is over. If the session is not over, the flowchart continues from module 254-2 for more block request statistics. Otherwise, if the session is over, the flowchart ends for modules 254-2 to 258-2.

Figure 10:
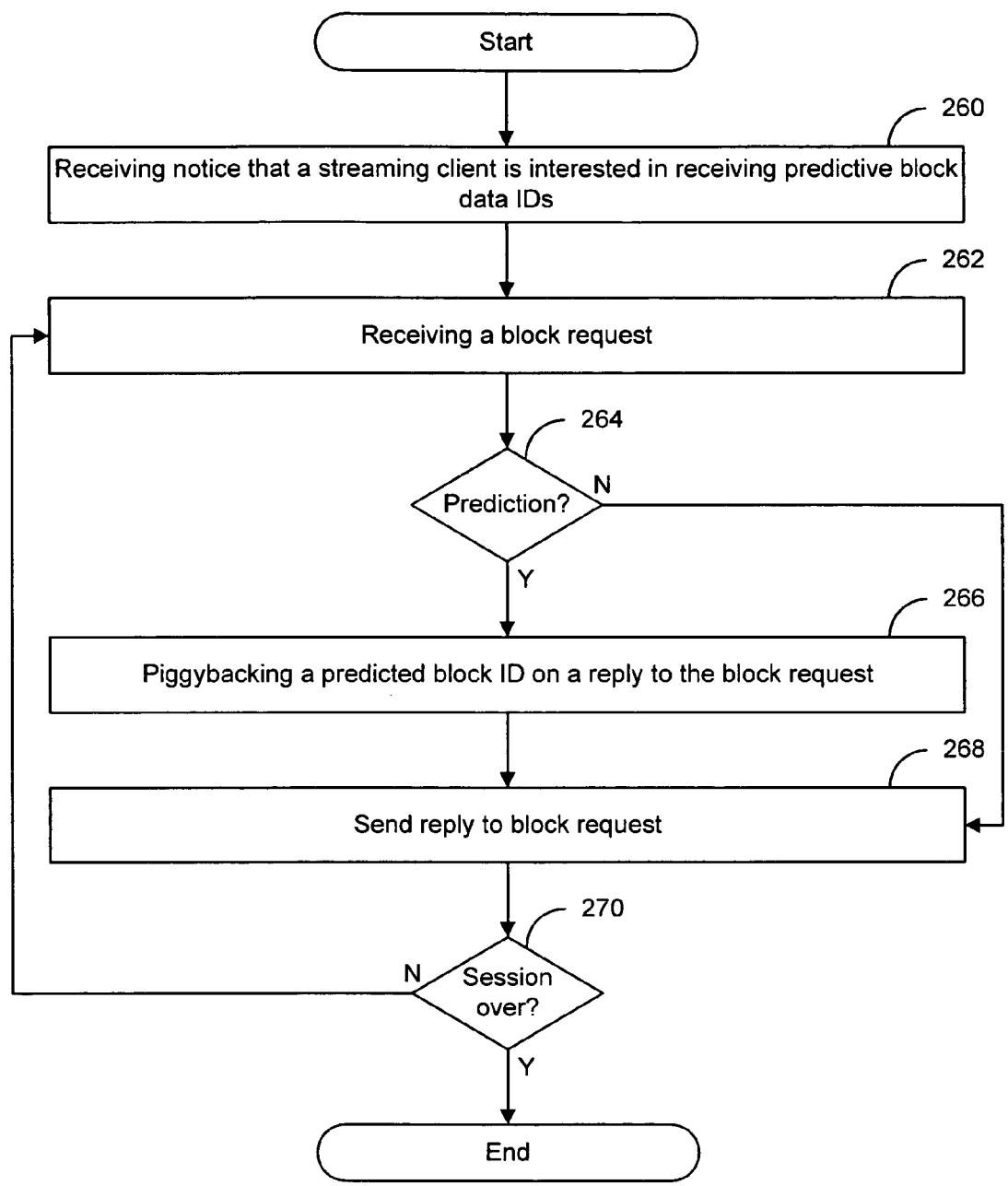

In another embodiment, a streaming client may indicate to a streaming server that the streaming client is interested in receiving predictive block data IDs. Then the streaming server would piggyback the IDs, as described previously. FIG. 10 depicts a flowchart of an exemplary method for providing predictions to a streaming client. The flowchart begins at module 260 with receiving notice that a streaming client is interested in receiving predictive block data IDs. The streaming client may send the notice when requesting streaming of an application from a streaming server. The flowchart continues at module 262 with receiving a block request. The streaming server may receive the block request from the streaming client. The flowchart continues at decision point 264 where it is determined whether a prediction is available. If a prediction is available (264-Y), then the flowchart continues at module 266 with piggybacking one or more predicted block IDs on a reply to the block request, and at module 268 with sending the reply to the block request. If, on the other hand, a prediction is not available (264-N), then the flowchart continues at module 268 with sending the reply to the block request (with no predicted block ID). In either case, the flowchart continues at decision point 270, where it is determined whether the session is over. If the session is not over (270-N), then the flowchart continues at module 262, as described previously. If, on the other hand, the session is over (270-Y), then the flowchart ends.

Figure 11:
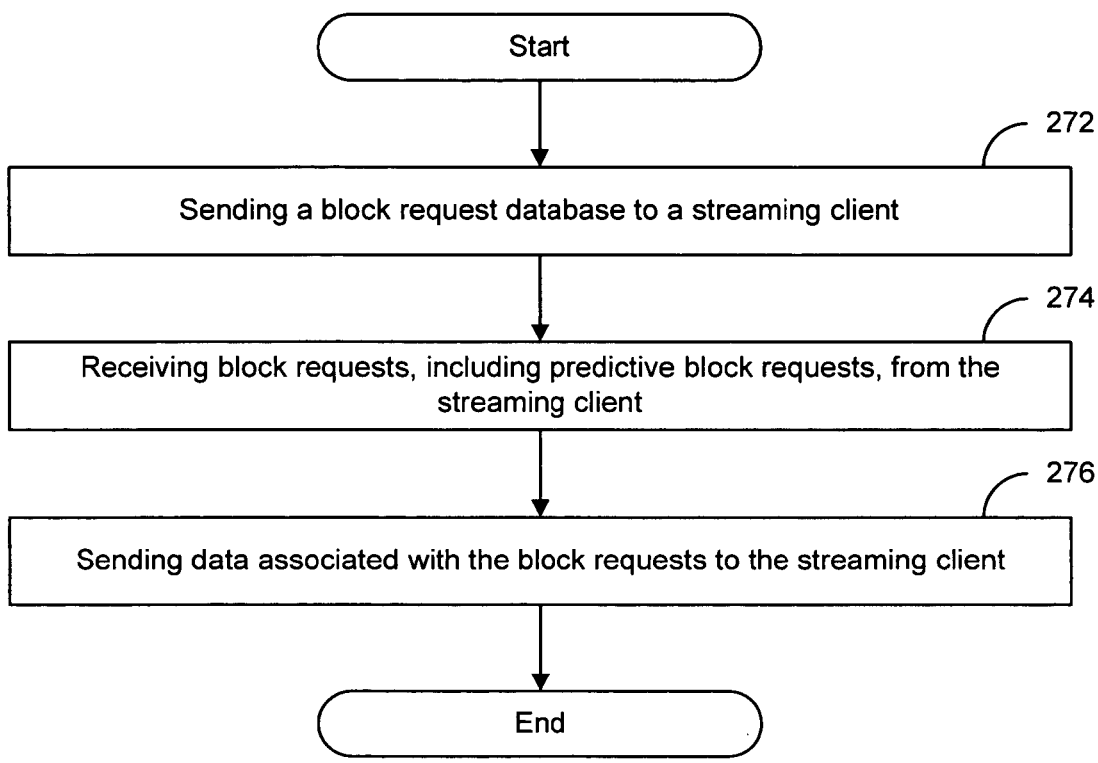

In another embodiment, the streaming server may send the block request database to the client along with an initial token file so that the client can do all of the predictive calculations. FIG. 11 depicts a flowchart of an exemplary method for providing predictive capabilities to a streaming client. The flowchart begins at module 272 with sending a block request database to a streaming client. The streaming client may or may not have requested the block request database from a streaming server. The block request database may be sent in response to a request for streaming of an application. The flowchart continues at module 274 with receiving block requests, including predictive block requests, from the streaming client. Since the streaming client has the block request database, the streaming client is able to make predictions about which blocks it should request in advance. The streaming server need not piggyback IDs in this case, since the streaming client makes the decision and requests the blocks directly. The flowchart ends at module 276 with sending data associated with the block requests to the streaming client. The streaming client may or may not send an alternate data stream with actual block request patterns to the streaming server. Modules 274 and 276 may occur intermittently or simultaneously.

Figure 12:
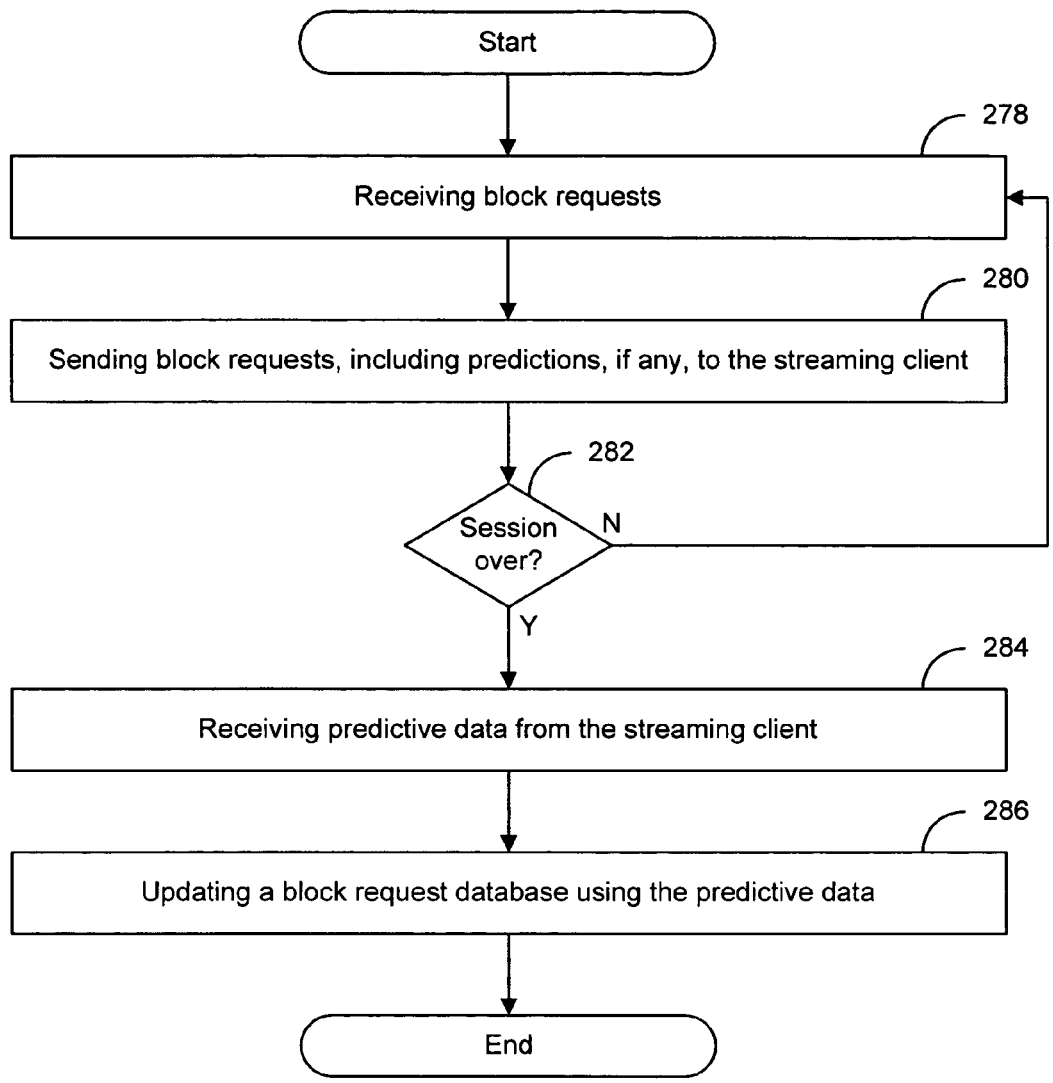

In another embodiment, the streaming client may collect predictive data locally and then send the data to the streaming server at the end of the session. FIG. 12 depicts a flowchart of an exemplary method for receiving predictive data from a streaming client. The flowchart begins at module 278 with receiving block requests. The block requests may be from a streaming client. The flowchart continues at module 280 with sending block requests, including predictions, if any, to the streaming client. The flowchart continues at decision point 282, where it is determined whether the session is over. If the session is not over (282-N), then the flowchart continues at module 278, as described previously. If, on the other hand, the session is over (282-Y), then the flowchart continues at module 284 with receiving predictive data from the streaming client. The predictive data may include a request log, a block request history, or one or more parameters derived from block request data. The flowchart ends at module 286 with updating a block request database using the predictive data. In this way, the streaming server can adapt the block request database in response to each session.

In an alternative embodiment, a streaming server can maintain a block request database that keeps track of "runs." Runs are sets of blocks for which the block requests occur closely spaced in time. For example, if a sequence of blocks is requested within, say, 0.5 second of a preceding block request in the sequence, the sequence of blocks may be referred to as a run. Runs can be used to efficiently utilize memory resources by recording probabilities on the run level instead of per block. Runs can also be used to reduce the amount of predictive download data. For example, for a level-based game, a user may download a first block, then the rest of the game will be predictively downloaded for each level, since the probabilities of downloading each level are, for the purposes of this example, nearly 100%.

By keeping track of runs, after the first level has been downloaded, predictive downloads can be "shut off" until the start of blocks for the second level begin. For example, if the blocks at the beginning of the run, which trigger or signal the run, are detected, the block IDs for the rest of the run may be sent to the streaming client, who then chain requests them. However, those subsequent block requests do not trigger any further run. So, the predictive downloads cause the blocks in the middle of a run to not act as a triggering prefix of another run; no further predictions are made from the middle of a run.

Figure 13:
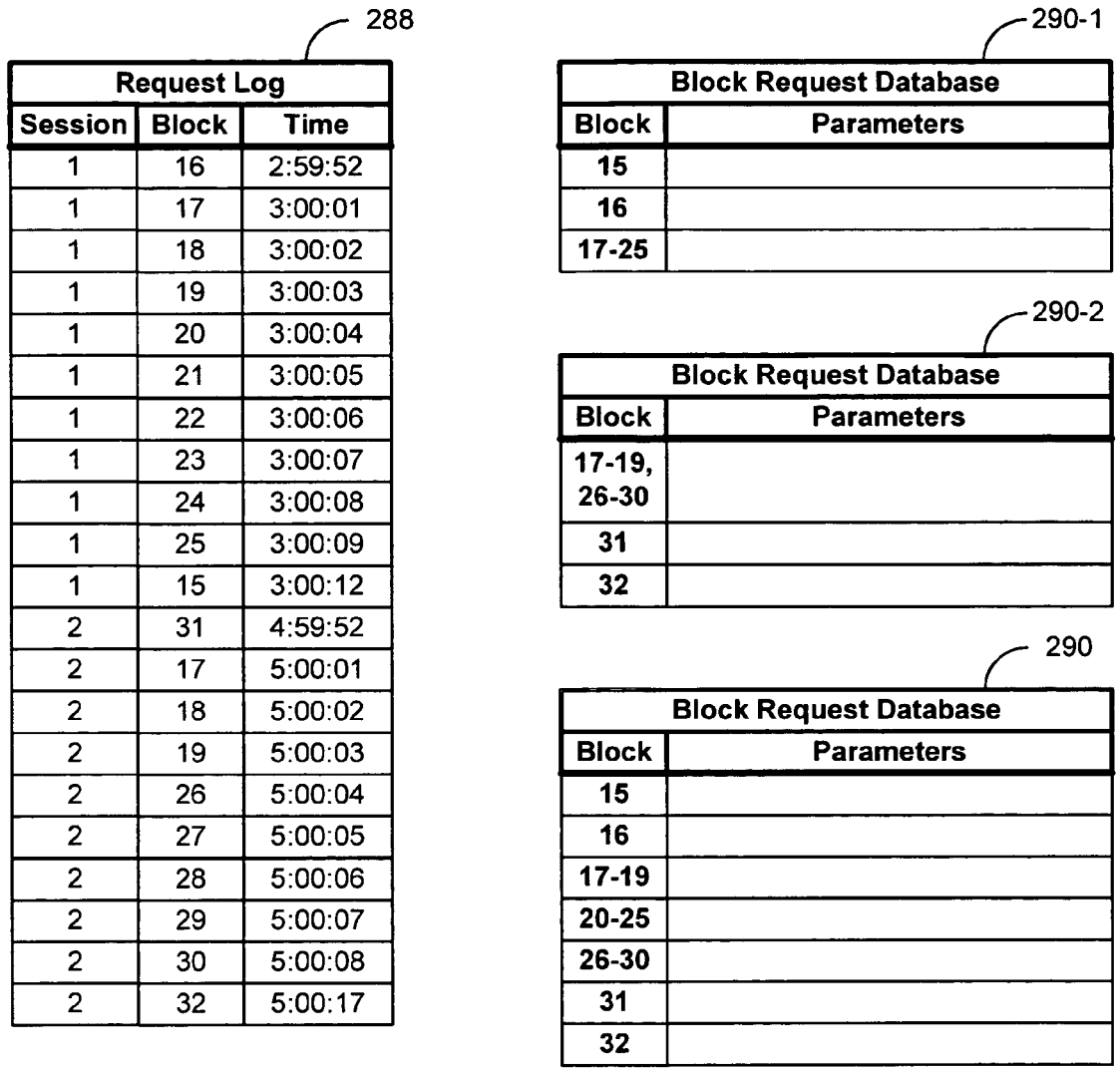
FIG. 13 depicts an exemplary log request and block request database according to an embodiment.

FIG. 13 is intended to illustrate maintaining a block request database that includes runs. FIG. 13 depicts a request log 288 and a block request database 290. Parameters associated with blocks and runs are omitted from the block request database 290 so as to more clearly focus on the point being illustrated. The omitted parameters could be any parameters derived from the request log for the purpose of facilitating the prediction of future block requests (e.g., first-order probabilities). The request log 288 includes two sessions, Session 1 and Session 2. In Session 1, a series of blocks are received in succession. For the purposes of example, a run parameter (not shown) is set to one second. If blocks are received within one second of one another, they may be considered part of a run. In the example of FIG. 13, the blocks 17–25 are received within one second of one another, and the blocks 15 and 16 are received more than one second from each of the blocks 17–25. When parameters are derived for inclusion in the block request database 290, the blocks 17–25, which are a run, can be grouped together, as illustrated in block request database 290-1. In Session 2, a different series of blocks are received in succession. The blocks 17–19 and 26–30 are received within one second of one another so, in this example, they can be considered a run. The run can be grouped together, as illustrated in block request database 290-2. When the block request database 290-1 and block request database 290-2 are combined, since the run 17–25 is no longer certain (i.e., an alternative run could be 17–19, 26–30), the run must be broken into two different runs, as depicted in the block request database 290. In this way, fewer data entries (one for each requested block) are required, since blocks can be grouped as a run.

When a run is stored in the block request database, each block of the run may be downloaded in succession without requiring individual predictions. In an alternative embodiment, each successive block of a run may be given an effective probability of 1.0, which guarantees favorable predictive treatment regardless of the aggressiveness threshold (assuming the threshold allows for some prediction). In yet another alternative, a streaming client may receive an identifier for the run and request successive blocks in the run, using the identifier to identify the successive blocks.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A method, comprising:
   receiving a request for a first block of a streaming application;
   checking a block request database;
   predicting a second block request based on the block request database;
   sending, in response to the request, data associated with the first block and data associated with the second block;
   logging the request for the first block;
   updating the block request database to incorporate data associated with the logged request;
   wherein the logged request is a first logged request, setting a temporal aggressiveness parameter, wherein the block request database is updated to incorporate data associated with the first logged request to the extent that associations with a second logged request is made if a difference between a receive time associated with the first logged request and the second logged request is less than the temporal aggressiveness parameter.

2. The method of claim 1, further comprising predicting a plurality of block requests based on the block request database, wherein said sending further includes sending data associated with the plurality of block requests.

3. The method of claim 1, wherein the data associated with the second block is sufficient to identify the second block so as to facilitate making a request for the second block.

4. The method of claim 1, wherein the data associated with the second block includes data sufficient to render a request for the second block unnecessary.

5. The method of claim 1, further comprising piggybacking the data associated with the second block on a reply to the request for the first block.

6. The method of claim 1, further comprising setting an aggressiveness parameter, wherein the data associated with the second block is sent when a probability of the second block request is higher than the aggressiveness parameter.

7. A system comprising:
   a means for receiving a request for a first block of a streaming application;
   a means for checking a block request database;
   a means for predicting a second block request based on the block request database;
   a means for sending, in response to the request, data associated with the first block and data associated with the second block;
   a means for logging the request for the first block;
   a means for updating the block request database to incorporate data associated with the logged request;
   wherein the logged request is a first logged request, a means for setting a temporal aggressiveness parameter, wherein the block request database is updated to incorporate data associated with the first logged request to the extent that associations with a second logged request is made if a difference between a receive time associated with the first logged request and the second logged request is less than the temporal aggressiveness parameter.

8. The system of claim 7, wherein the data associated with the second block is sufficient to identify the second block so as to facilitate making a request for the second block.

9. The system of claim 7, wherein the data associated with the second block includes data sufficient to render a request for the second block unnecessary.

10. The system of claim 7, further comprising a means for piggybacking the data associated with the second block on a reply to the request for the first block.

11. A system comprising:
    a processor;
    a block request database that includes predictive parameters;
    a prediction engine, coupled to the processor and the block request database, that is configured to check the block request database and predict a second block request for a second block based upon a first block request for a first block and predictive parameters associated with the first block;
    a streaming server, coupled to the prediction engine, that is configured to:
      obtain the prediction about the second block request from the prediction engine,
      include data associated with the second block in a response to the first block request, in addition to data associated with the first block, and
      send the response in reply to the first block request;
    a request log, wherein the streaming server is further configured to log the first block request in the request log, wherein the prediction engine is further configured to update the block request database according to the request log;
    a temporal aggressiveness parameter embodied in a computer readable storage medium;
    wherein the logged request is a first logged request, wherein the block request database is updated to incorporate data associated with the first logged request to the extent that associations with a second logged request is made if a difference between a receive time associated with the first logged request and the second logged request is less than the temporal aggressiveness parameter.

12. The system of claim 11, wherein the data associated with the second block is sufficient to identify the second block so as to facilitate making the second block request.

13. The system of claim 11, wherein the data associated with the second block includes data sufficient to render the second block request unnecessary.

14. The system of claim 11, wherein the streaming server is further configured to piggyback the data associated with the second block on a reply to the first block request.

* * * * *